United States Patent
Pauli

(10) Patent No.: US 12,263,815 B2
(45) Date of Patent: Apr. 1, 2025

(54) DEVICES AND METHODS TO LOAD AND TRANSPORT ARTICLES

(71) Applicant: Richard B. Pauli, Hayward, WI (US)

(72) Inventor: Richard B. Pauli, Hayward, WI (US)

(*) Notice: Subject to any disclaimer, the term of this patent is extended or adjusted under 35 U.S.C. 154(b) by 0 days.

(21) Appl. No.: 18/456,476

(22) Filed: Aug. 25, 2023

(65) Prior Publication Data

US 2024/0067098 A1 Feb. 29, 2024

Related U.S. Application Data

(60) Provisional application No. 63/373,478, filed on Aug. 25, 2022.

(51) Int. Cl.
*B60R 9/04* (2006.01)
*B60R 9/042* (2006.01)
*B60R 9/048* (2006.01)

(52) U.S. Cl.
CPC .............. *B60R 9/042* (2013.01); *B60R 9/048* (2013.01)

(58) Field of Classification Search
CPC ........... B60R 9/042; B60R 9/048; B60R 9/00; B60R 9/04; B60R 9/052; B60R 9/045; B60R 9/08
USPC ........................................................ 211/187
See application file for complete search history.

(56) References Cited

U.S. PATENT DOCUMENTS

| | | |
|---|---|---|
| 4,146,198 A | 3/1979 | Bott |
| 4,474,520 A * | 10/1984 | Buckner ................. E21B 19/15 187/245 |
| 5,292,045 A | 3/1994 | Mandel |
| 5,497,925 A | 3/1996 | Lumpe |
| 5,829,948 A * | 11/1998 | Becklund .............. B66F 7/0625 254/8 R |
| 6,164,507 A | 12/2000 | Dean et al. |
| 6,250,528 B1 | 6/2001 | Lumpe |
| 6,428,263 B1 | 8/2002 | Schellens |
| 6,561,396 B2 | 5/2003 | Ketterhagen |
| 6,622,898 B1 | 9/2003 | Wang |
| 7,780,050 B2 | 8/2010 | Tucker |
| 8,042,229 B2 * | 10/2011 | Wang ..................... A47B 57/26 211/171 |
| 8,136,708 B2 | 3/2012 | Sautter et al. |
| 8,167,180 B2 | 5/2012 | Bogoslofski et al. |
| 8,845,260 B2 * | 9/2014 | Gerber .................... E21B 19/15 414/745.7 |
| 9,187,047 B2 | 11/2015 | Sautter et al. |
| 9,266,478 B2 | 2/2016 | Patel |
| 9,290,130 B2 | 3/2016 | Buller |
| 9,975,494 B2 | 5/2018 | Connors |
| 10,246,025 B1 * | 4/2019 | Knigge .................. B60R 9/042 |
| 10,322,662 B2 | 6/2019 | Lasley |
| 10,343,617 B2 | 7/2019 | Cox |

(Continued)

OTHER PUBLICATIONS

"DIY Kayak Boat Canoe Lifter" ("Lifter") ; YouTube Video https://youtu.be/q3e61xCQzKg?si=cmIn5zYLx3RRdYvA and screenshots Lifter—1, Lifter—2, and Lifter—3; Alan Howell; Dec. 2019) (Year: 2019).*

(Continued)

*Primary Examiner* — Lynn E Schwenning
(74) *Attorney, Agent, or Firm* — DeWitt LLP; Brian R. Pollack, Esq.

(57) ABSTRACT

The disclosure provides embodiments of devices and systems to load one or more objects on top of a vehicle or other structure.

16 Claims, 37 Drawing Sheets

(56) References Cited

U.S. PATENT DOCUMENTS

| | | |
|---|---|---|
| 10,780,837 B2* | 9/2020 | Sautter .................... B60R 9/052 |
| 2003/0173384 A1 | 9/2003 | Clark et al. |
| 2003/0178382 A1* | 9/2003 | Tucker ................. A47B 96/061 |
| | | 211/85.7 |
| 2005/0082325 A1 | 4/2005 | Bourne |
| 2005/0092800 A1 | 5/2005 | Wilson |
| 2007/0090139 A1 | 4/2007 | McKenzie |
| 2007/0177964 A1 | 8/2007 | Bosela |
| 2008/0035688 A1* | 2/2008 | Malone ................... B60R 9/042 |
| | | 224/310 |
| 2010/0193555 A1 | 8/2010 | Gift |
| 2014/0144959 A1 | 5/2014 | Sautter et al. |
| 2015/0089779 A1 | 4/2015 | Lawrence et al. |
| 2017/0144605 A1 | 5/2017 | Kelly et al. |
| 2017/0209728 A1* | 7/2017 | Lagree ................. A63B 21/055 |
| 2019/0106062 A1* | 4/2019 | Olsen ....................... B60R 9/06 |
| 2019/0291652 A1 | 9/2019 | Lester |
| 2020/0062188 A1* | 2/2020 | Boyle ..................... B60R 9/042 |

OTHER PUBLICATIONS

"How to load a kayak by yourself" ("Loader"); YouTube Video https://www.youtube.com/watch?v=uGLbqmkiuKY and screenshots Loader—1 and Loader—2, Jul. 2021 (Year: 2021).*
"Understanding Levers" ("Levers"; Professional Safety Journal; Mitch Rickets; Oct. 2020) (Year: 2020).*

* cited by examiner

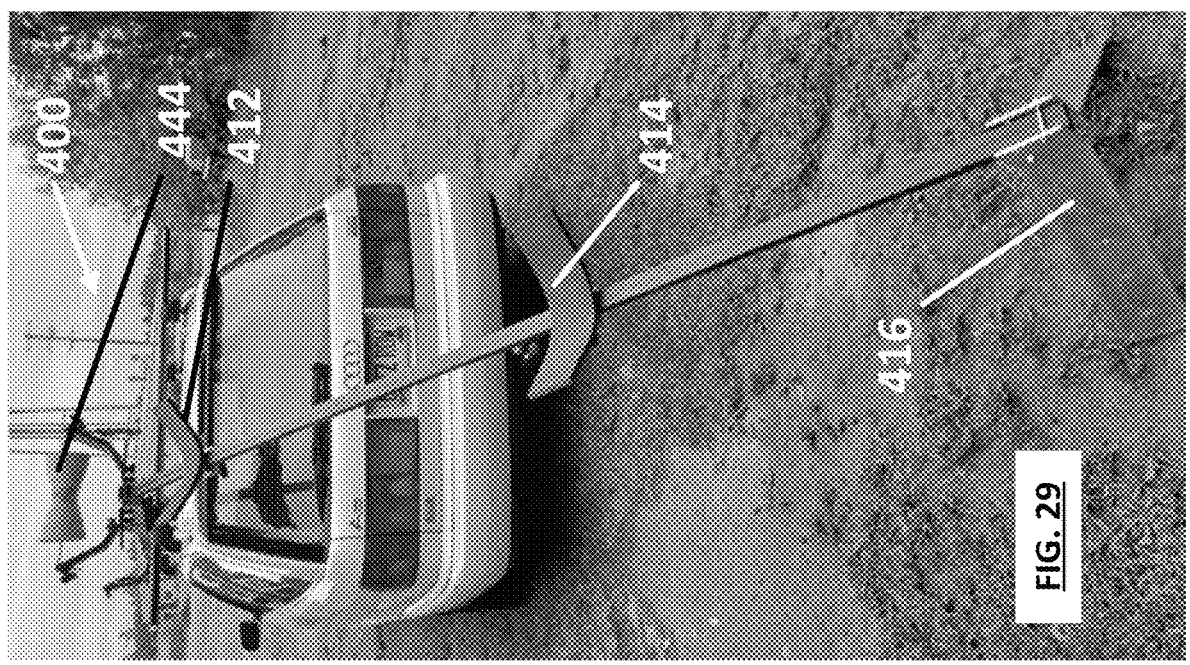

FIG. 39 — BOTTOM LEG — 610A, 620A
FIG. 40 — CENTER LEG — 610B, 620B
FIG. 41 — 610B, 620B
FIG. 42 — TOP LEG — 610C, 620C
FIG. 43 — 610C, 620C

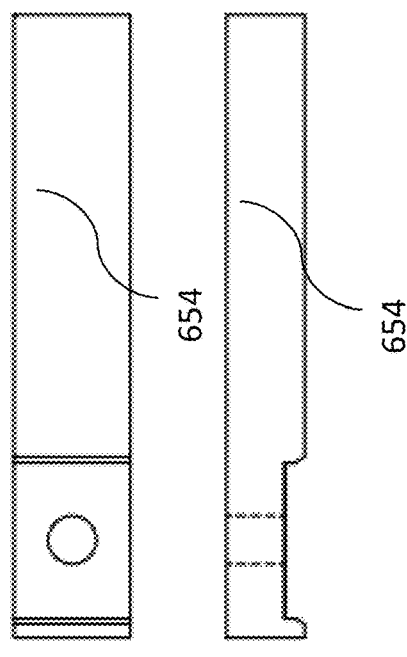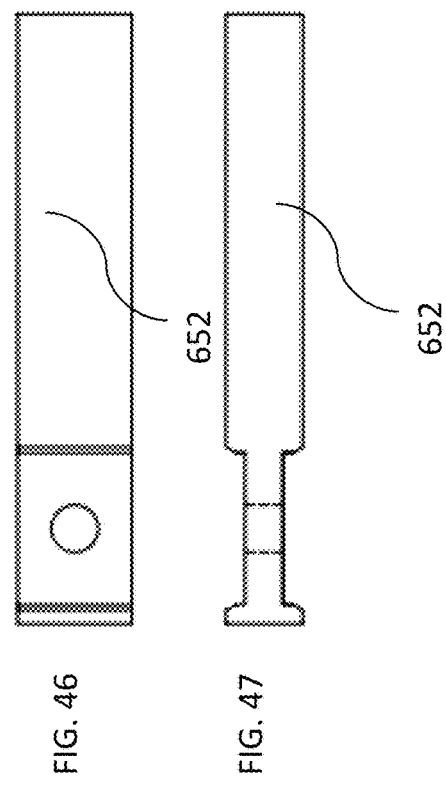

DEVICES AND METHODS TO LOAD AND TRANSPORT ARTICLES

CROSS-REFERENCE TO RELATED APPLICATION

The present patent application claims the benefit of priority to U.S. Provisional Patent Application No. 63/373,478, filed Aug. 25, 2025. The aforementioned patent application is incorporated by reference herein in its entirety for all purposes.

BACKGROUND

Various attempts have been made at designing specialty roof racks for the safe loading and transport of personal water craft (e.g., kayaks, crew shells and the like). However, Applicant has come to appreciate that current approaches have considerable limitations. The present disclosure improves upon the state of the art.

SUMMARY

Aspects of the present disclosure relate to, among other things, the safe loading and transport of personal watercraft, including but not limited to kayaks and crew shells. Those of skill in the art will recognize that the present disclosure encompasses the safe loading and transport of other articles as well such as tools, construction materials, and elongate objects generally. The disclosed embodiments can generally be operated by a single person to load a heavy object on top of a vehicle, for example, which would otherwise be a very difficult task.

In accordance with some implementations, embodiments of a device and system are provided that can be used to implement a method of loading an elongate object on top of a vehicle. The method can include providing a plurality of elongate supports. Each of the supports can include a plurality of fixed or deployable generally parallel protrusions that extend outwardly therefrom.

The method can further include coupling a first of the plurality of elongate supports to a vehicle with its respective plurality of generally parallel protrusions extending outwardly with respect to the vehicle, and coupling a second of the plurality of elongate supports to a vehicle with its respective plurality of generally parallel protrusions extending outwardly with respect to the vehicle, wherein the first and second elongate supports are separated from one another along the length of the vehicle by a first distance.

The method further includes providing an elongate object that is longer than the first distance alongside the vehicle, and lifting a first end of the elongate object and placing it on a lower protrusion extending outwardly from the first of the plurality of elongate supports, after which the elongate object rests on the lower protrusion of the first of the plurality of elongate supports. Next, the method can include lifting a second end of the elongate object and placing it on a lower protrusion extending outwardly from the second of the plurality of elongate supports, after which the elongate object rests on the lower protrusion of the second of the plurality of elongate supports and on the lower protrusion of the first of the plurality of elongate supports.

The method can still further include lifting the first end of the elongate object and placing it on an upper protrusion extending outwardly from the first of the plurality of elongate supports, after which the elongate object rests on the upper protrusion of the first of the plurality of elongate supports and the lower protrusion of the second of the plurality of elongate supports. The method can include next lifting the second end of the elongate object and placing it on an upper protrusion extending outwardly from the second of the plurality of elongate supports, after which the elongate object rests on the upper protrusion of the second of the plurality of elongate supports and on the upper protrusion of the first of the plurality of elongate supports. It will be appreciated that the aforementioned method can be modified as desired to include more steps, fewer steps, or different steps.

The method can still further include lifting the first end of the elongate object into a first cradle on top of the vehicle, and then lifting the second end of the elongate object into a second cradle on top of the vehicle. The method can then include securing the elongate object to the first cradle and the second cradle.

In some implementations, at least one of the plurality of elongate supports can be coupled proximate an first end of the elongate support to the vehicle, and further wherein a second end of the elongate support is positioned to rest on the ground. The method can still further include coupling at least one of the plurality of the elongate supports to the vehicle at a second location to help stabilize said elongate support. In some implementations, each elongate support and each protrusion is padded to prevent damage to the elongate object. In some implementations of the method, the elongate object can be rested against a main portion of each elongate support when it is placed on at least one of the protrusions. Alternatively, the elongate object can be supported in a concave cradle formed on the protrusion or with the protrusion.

In some implementations, the method can include assembling at least one of the plurality of elongate supports from a plurality of shorter components. For example, the shorter components can be coupled to each other by way of at least one fastener. If desired, the shorter components can be nested within each other and extend with respect to each other in a telescoping manner. In some implementations, the shorter components are hingedly coupled to each other. The disclosure further includes implementations of devices to implement any of the methods described herein.

The disclosure provides further methods of loading an elongate object on top of a vehicle. In some implementations, this can include coupling a first movable cradle to a vehicle, and coupling a second movable cradle to a vehicle. Each of the first cradle and the second cradle can be positioned in a first position alongside the vehicle. The method further includes placing an elongate object onto the first cradle on the second cradle. The method then includes raising the first movable cradle to a second position higher than the first position, and then raising the second movable cradle to a second position higher than the first position after raising the first movable cradle to the second position. If desired, the cradles of any implementation herein can be reversible, rotatable or exchangeable to provide a flat surface, a concave surface or a convex surface.

The method can further include lifting the first end of the elongate object into a first cradle on top of the vehicle, and then lifting the second end of the elongate object into a second cradle on top of the vehicle. The method can still further include securing the elongate object to the first cradle and the second cradle.

In some implementations, the first movable cradle and the second movable cradle can be automatically held in place in the second position by a pawl, ratchet, or detent. If desired, the first movable cradle and second movable cradle are moved from the first position to the second position by rotating each of them about an independent axis attached to a swing arm. In some embodiments, the first cradle and second cradle are moved from the first position to the second position by sliding them along a vertical direction in a track.

In some implementations, the first movable cradle and the second movable cradle can be biased from the first position toward the second position by a lift assist device selected from the group consisting of a spring, an elastic band and a strut. In other implementations, the lift assist device can include an electric drive using an electric motor, a pneumatic assist device, a hand crank or pullcord, and the like. In some implementations, the method can further include applying an external force to the first movable cradle or second movable cradle to move the first movable cradle or second movable cradle toward the first position to energize the lift assist device.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIGS. 26-29 present aspects of further systems and methods for loading an elongate object on top of a vehicle.

FIGS. 30-51 illustrate a further implementation of a system in accordance with the present disclosure, or aspects thereof.

DETAILED DESCRIPTION

The present disclosure is drawn, in various implementations, to systems and related methods for attaching articles to supports, vehicles, carts, or trailers, for example. Reference now will be made in detail to aspects of the present disclosure, examples of which are illustrated in the accompanying drawings. Wherever possible, the same reference numbers will be used throughout the drawings to refer to the same or like parts. As used herein, the terms "comprises," "comprising," or any other variation thereof, are intended to cover a non-exclusive inclusion such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Figure 1:
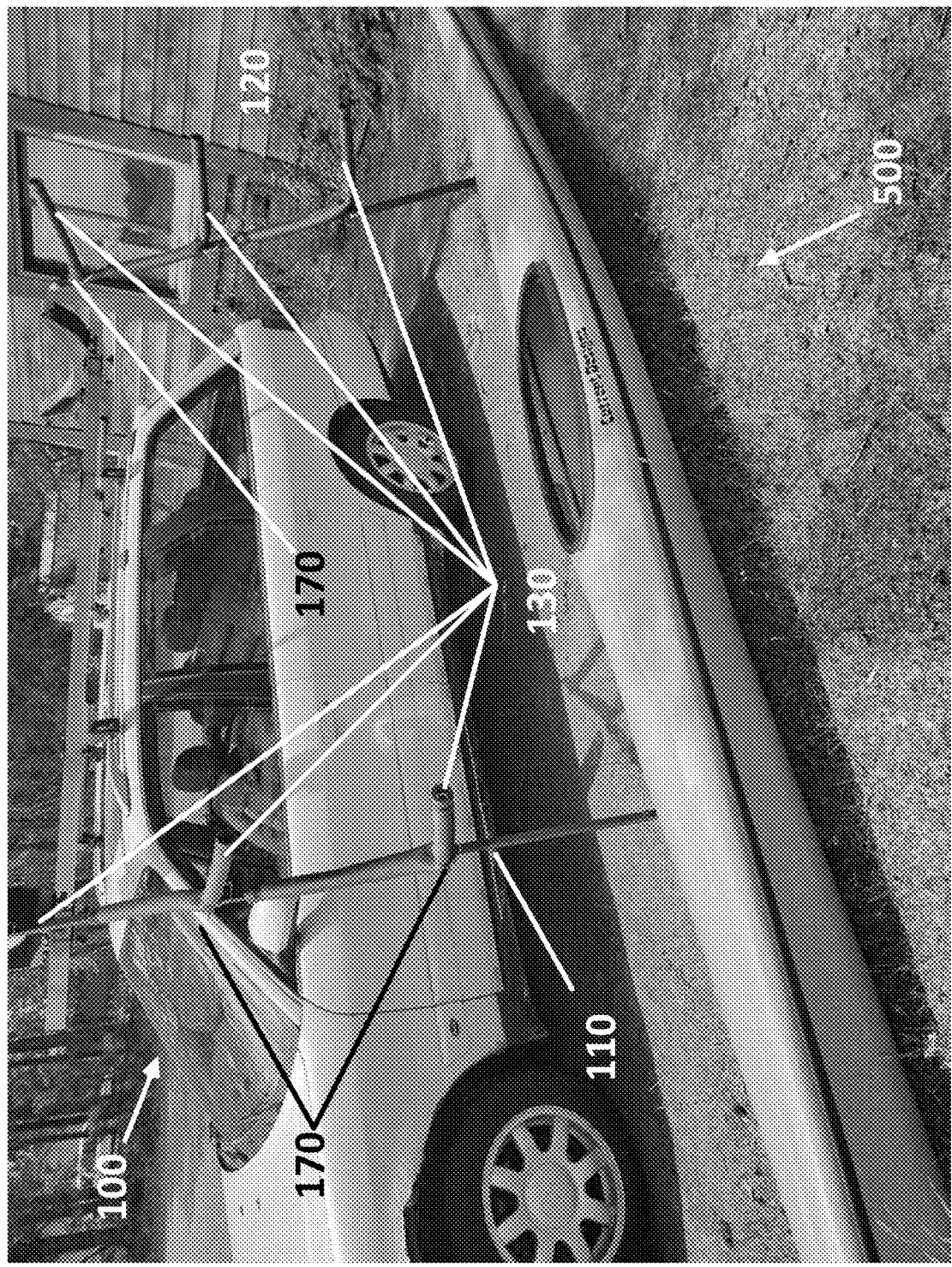
FIG. 1 is a first view of an embodiment of a system and related method for loading an elongate object on top of a vehicle in accordance with aspects of the present disclosure.

For purposes of illustration, and not limitation, an illustrative, non-limiting example of a system 100 for loading an elongate article on a vehicle, for example, is presented in FIG. 1. System 100 can be used to implement a method of loading an elongate object on top of a vehicle or to simply elevate it to a higher height, such as raising it up to a roof, and the like.

The method can include providing system 100, which includes a plurality of elongate supports 110, 120. Each of the supports can 110, 120 include a plurality of fixed or deployable generally parallel protrusions 130 that extend outwardly therefrom. The supports can be a single piece, or may be collapsible by way of a plurality of hinge points 170 described in further detail below. Alternatively, the supports 110, 120 can be snapped together or otherwise assembled from a plurality of smaller components.

Figure 9:
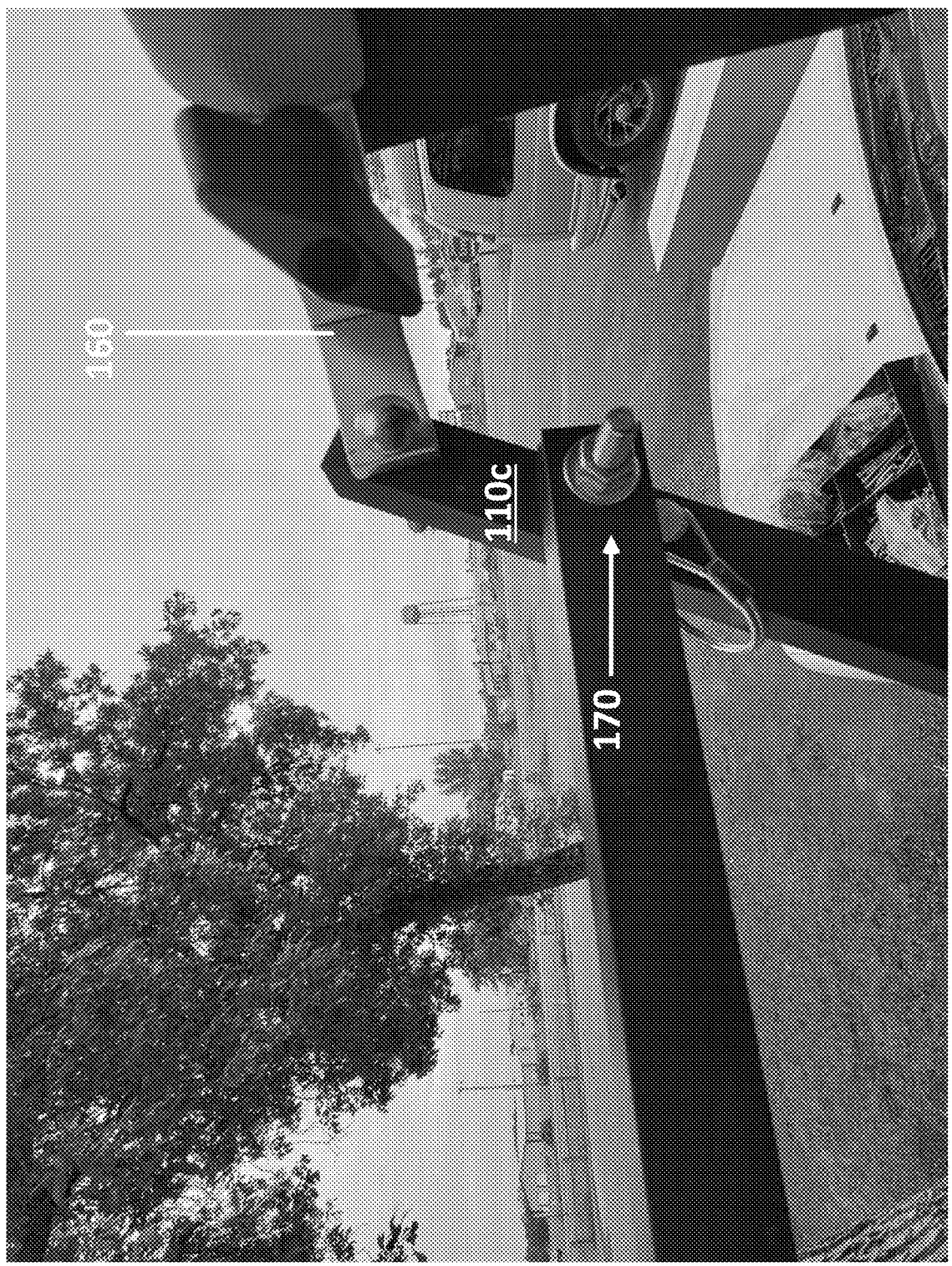
FIG. 9 illustrates a further aspect of the system of FIG. 1 coupling the system of FIG. 1 to the vehicle.
Figure 10:
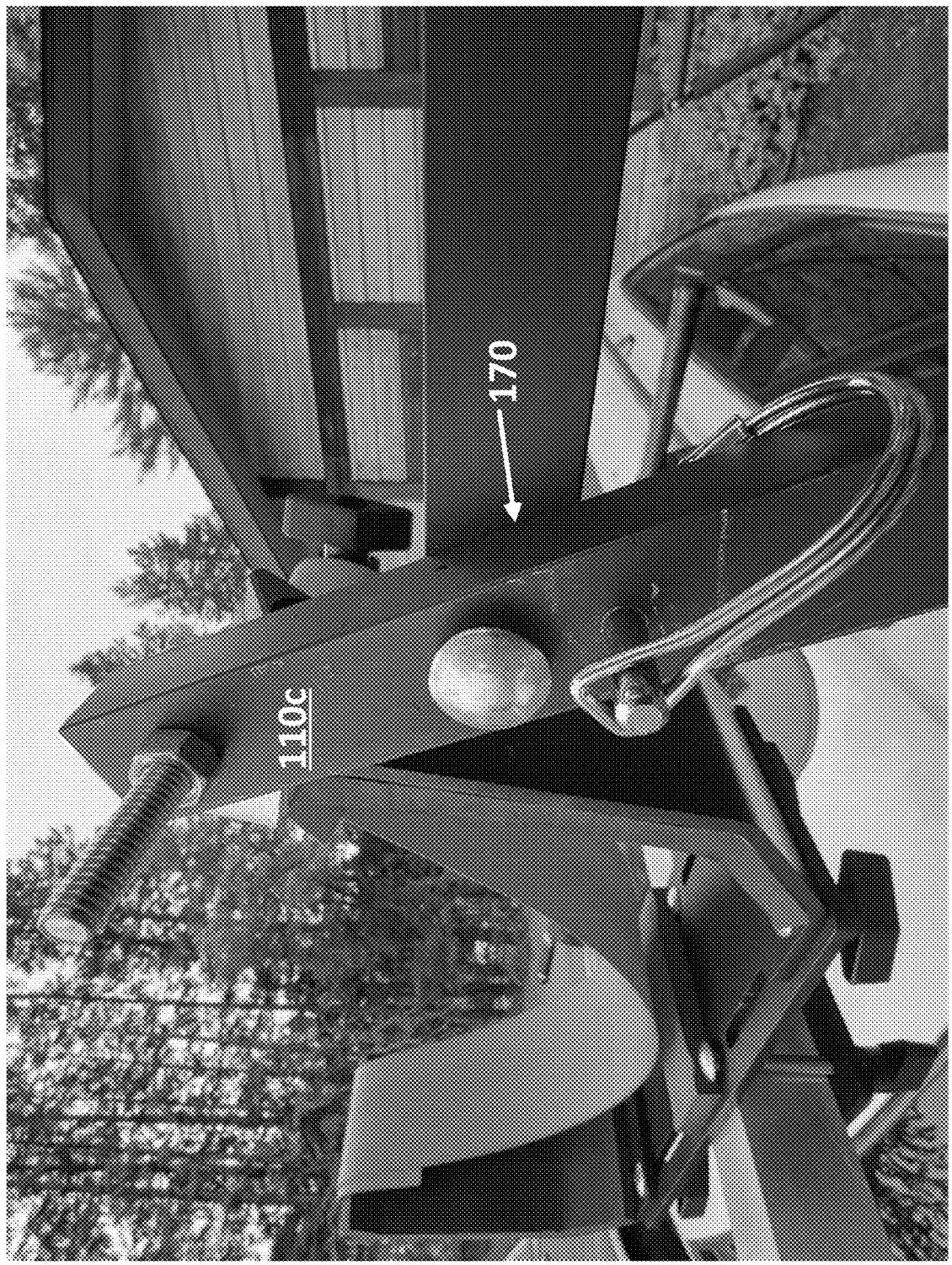
FIGS. 10, 11, and 14-17 illustrate aspects of deployable joints of the system of FIG. 1.
Figure 11:

As illustrated in FIG. 9, the supports 110, 120 can be coupled at an upper end, for example, to the vehicle or other structure by way of a connector 160. The connection is preferably made by way of refastenable fasteners. The method of use can include coupling a first of the plurality of elongate supports (e.g., 110) to a vehicle with its respective plurality of generally parallel protrusions (e.g., 130) extending outwardly with respect to the vehicle as illustrated in the Figures. The method of use can further include a second (e.g., 120) of the plurality of elongate supports to a vehicle with its respective plurality of generally parallel protrusions (e.g., 130) extending outwardly with respect to the vehicle, wherein the first and second elongate supports 110, 120 are separated from one another along the length of the vehicle or other object by a first distance, as illustrated, for example, in FIG. 1.

Figure 2:
FIG. 2 is a view of the embodiment of FIG. 1 illustrating a step of a representative method in accordance with the disclosure.
Figure 4:
FIG. 4 is a view of the embodiment of FIG. 1 illustrating a further step of the representative method.

With reference to FIGS. 2 and 4, the method can further include providing an elongate object (e.g., boat or crew shell 500 in FIG. 1) that is longer than the first distance alongside the vehicle, and lifting a first end of the elongate object 500 and placing it on a lower protrusion 130a extending outwardly from the first of the plurality of elongate supports 110, after which the elongate object rests on the lower protrusion 130a of the first of the plurality of elongate supports as illustrated in FIG. 2.

Figure 3:
FIG. 3 is a view of the embodiment of FIG. 1 illustrating a further step of the representative method.

Next, and with reference to FIG. 3, the method can further include lifting a second end of the elongate object 500 and placing it on a lower protrusion 130d extending outwardly from the second 120 of the plurality of elongate supports, after which the elongate object rests on the lower protrusion 130d of the second 120 of the plurality of elongate supports and on the lower protrusion 130a of the first of the plurality of elongate supports 110. In the illustrated example, during this step of the method, the protrusion 130a extending from support 110 acts as a fulcrum in a Class 2 lever arrangement to permit a single individual to get the entire elongate object off of the ground.

Figure 5:
FIG. 5 is a view of the embodiment of FIG. 1 illustrating a further step of the representative method.
Figure 6:
FIG. 6 is a view of the embodiment of FIG. 1 illustrating a further step of the representative method.

As illustrated in FIG. 4, the method of use can still further include once again lifting the first end of the elongate object 500 off of the lowermost protrusion 130a and placing it on an upper protrusion (the next protrusion 130b extending from support 110) that extends outwardly from the first 110 of the plurality of elongate supports. After this step is completed, the elongate object 500 rests on the upper protrusion 130b of the first of the plurality of elongate supports and the lower protrusion 130d of the second of the plurality of elongate supports. As illustrated in FIG. 5, the method can include next lifting the second end of the elongate object 500 and placing it on an upper protrusion 130e extending outwardly from the second of the plurality of elongate supports 120, after which the elongate object rests on the upper protrusion 130b of the second of the plurality of elongate supports and on the upper protrusion 130e of the first of the plurality of elongate supports 120. As illustrated in FIG. 6, the previous process can be repeated by lifting the front end of the elongate object 500 off of protrusion 130b and raising it and resting it on protrusion 130c, and the rear end of the object 500 can be lifted off of protrusion 130e and rested onto protrusion 130f. While the object 500 is now at its desired elevation, it will be appreciated that the aforementioned method can be modified as desired to include more steps, fewer steps, or different steps to achieve progressively lifting the object to its desired end height.

Figure 7:
FIG. 7 is a view of the embodiment of FIG. 1 illustrating a further step of the representative method.
Figure 8:
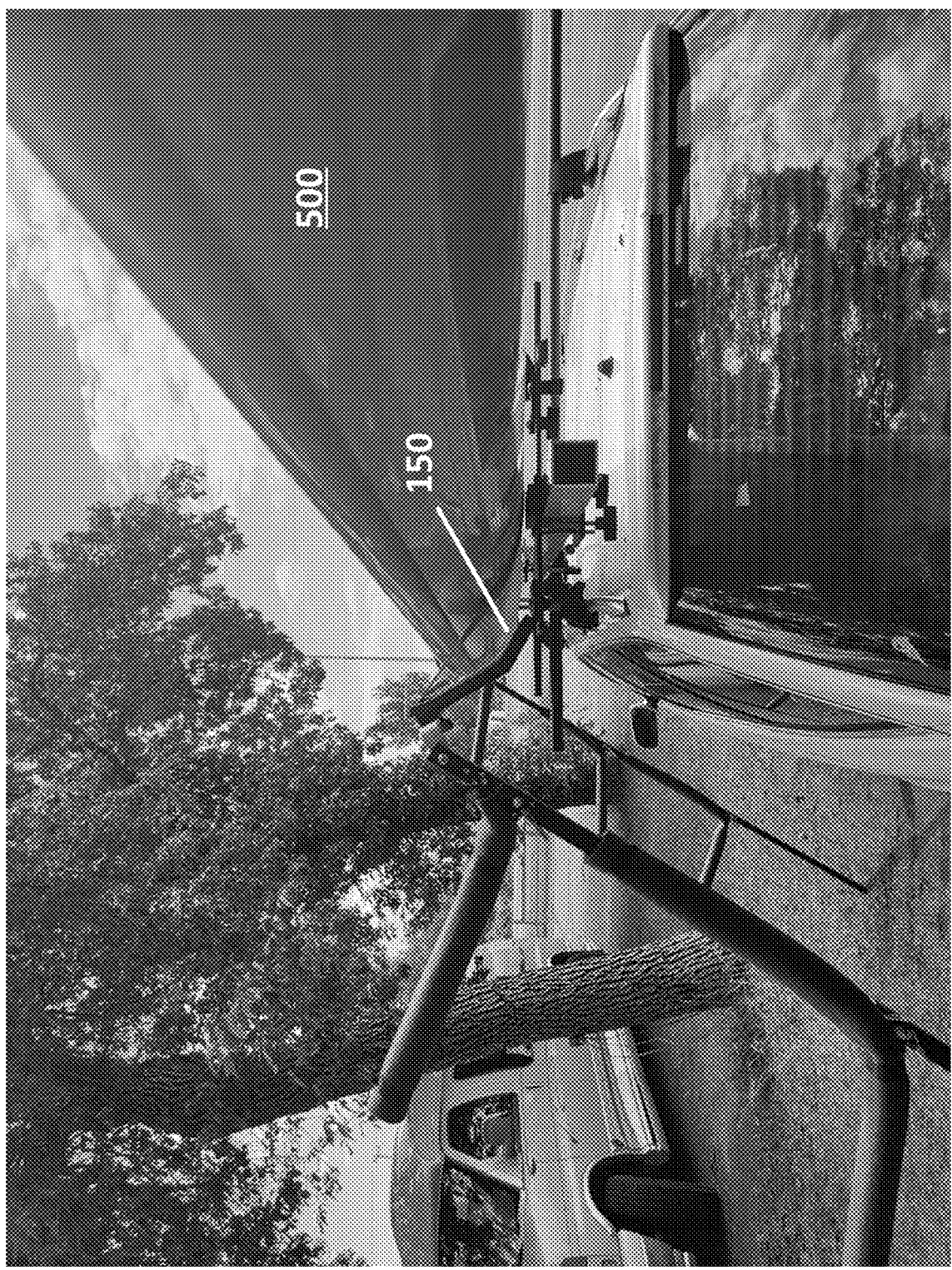
FIG. 8 is a view of the embodiment of FIG. 1 illustrating a further step of the representative method.

With reference to FIGS. 7 and 8, the method can still further include lifting the first end of the elongate object 500 into a first cradle 140 on top of the vehicle, and then lifting the second end of the elongate object 500 into a second cradle 150 on top of the vehicle. The cradles can simply be V or U-shaped structures with padding therein, or may be fitted with a conforming sling 142, 152 as illustrated in the drawings that is suspended between the ends of the cradles. The method can then include securing the elongate object to the first cradle and the second cradle, such as by strapping the object in place using any technique, including but not limited to those described in U.S. patent application Ser. No. 16/900,307, filed Jun. 12, 2020, and U.S. patent application Ser. No. 17/819,585, filed Aug. 12, 2022, which are incorporated by reference herein in their entireties for all purposes.

In some implementations, at least one of the plurality of elongate supports (e.g., 110, 120) can be coupled proximate a first end of the elongate support to the vehicle as illustrated in FIG. 9 via a fastener, adapter or bracket 160 and associated hardware such as screws, bolts, clips, and the like. The supports 110, 120 can be releasably coupled to a roof rack of a vehicle, for example, or to whatever object the elongate object is being raised to be placed on top of. As illustrated in FIG. 1, for example, a second end of the elongate support can positioned to rest on the ground. Alternatively, the supports 110, 120 can be configured to be suspended above the ground and instead be coupled only at their upper ends to the vehicle.

Figure 18:
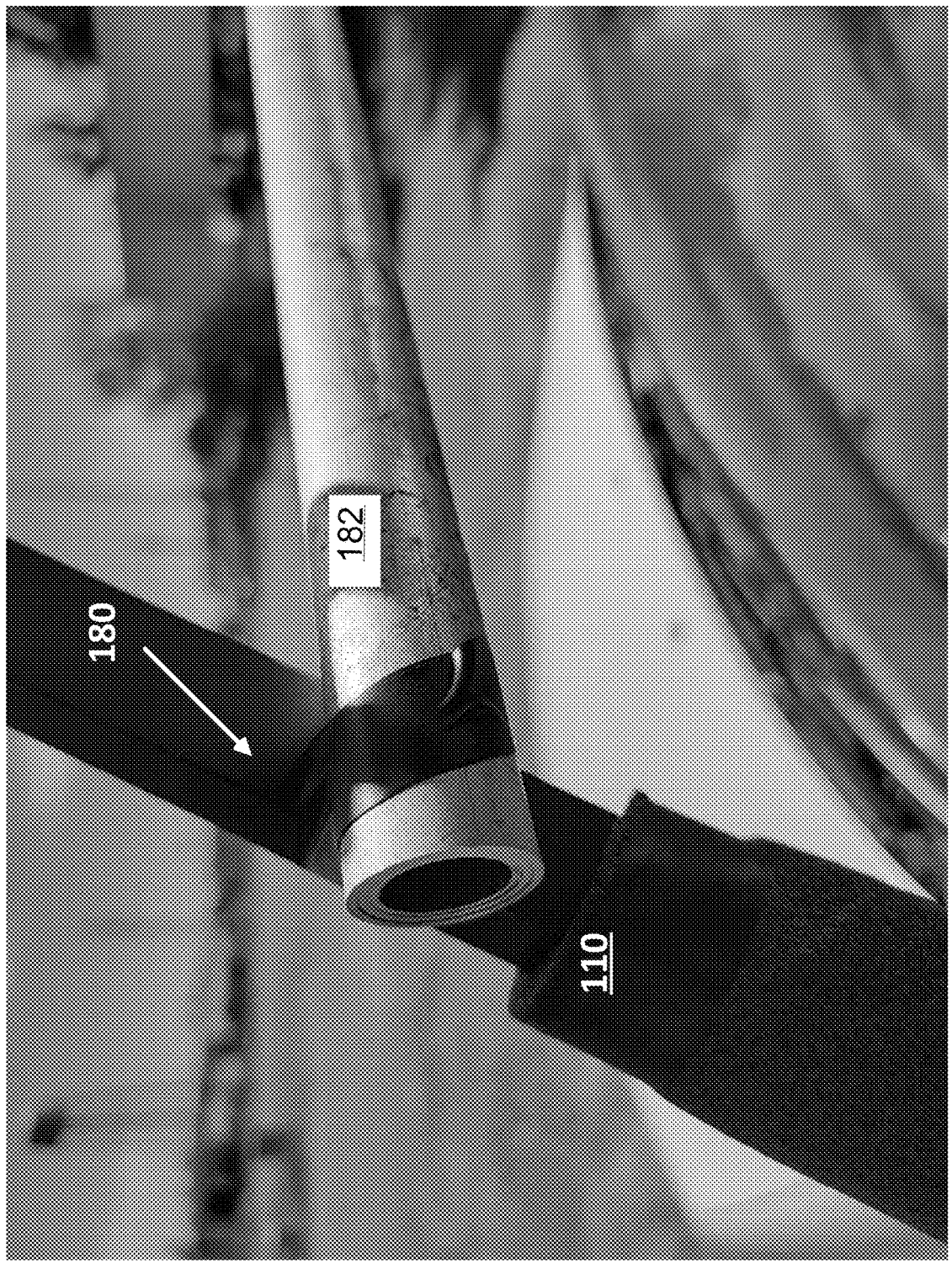
FIG. 18 illustrates a first implementation of a secondary connection point of a portion of the system of FIG. 1 to a vehicle to help stabilize the system.
Figure 19:
FIG. 19 illustrates a second implementation of a secondary connection point of a portion of the system of FIG. 1 to a vehicle to help stabilize the system.

As illustrated in FIG. 18, the method of use of system 100 can include coupling at least one of the plurality of the elongate supports 110, 120 to the vehicle at a second location to help stabilize said elongate support. As illustrate in FIG. 18, a lateral bar or support 182 can be coupled to the roof rack of the vehicle, or other portion of the vehicle, and this can be coupled via a coupling 180, such as a strap, tape, hook and loop fastener, shock cord, or other fastener. This provides a first point of connection for support 110 via bracket 160, for example, and a second support via connection 180. FIG. 19 illustrates a different implementation of such a support as element 190 which is attached at a first end to the roof rack or other structure of the vehicle, and at a second end to the support 110.

With reference to FIG. 2, in some implementations, each elongate support 110, 120 and each protrusion 130 can be padded with padding sections 112, 122 to prevent damage to the elongate object 500. In some implementations of the method, the elongate object 500 can be rested against a main portion of each elongate support 110, 120 when it is placed on at least one of the protrusions. Alternatively, the elongate object can be supported in a concave cradle formed on the protrusion or with the protrusion similar to those presented in FIG. 20.

Figure 12:
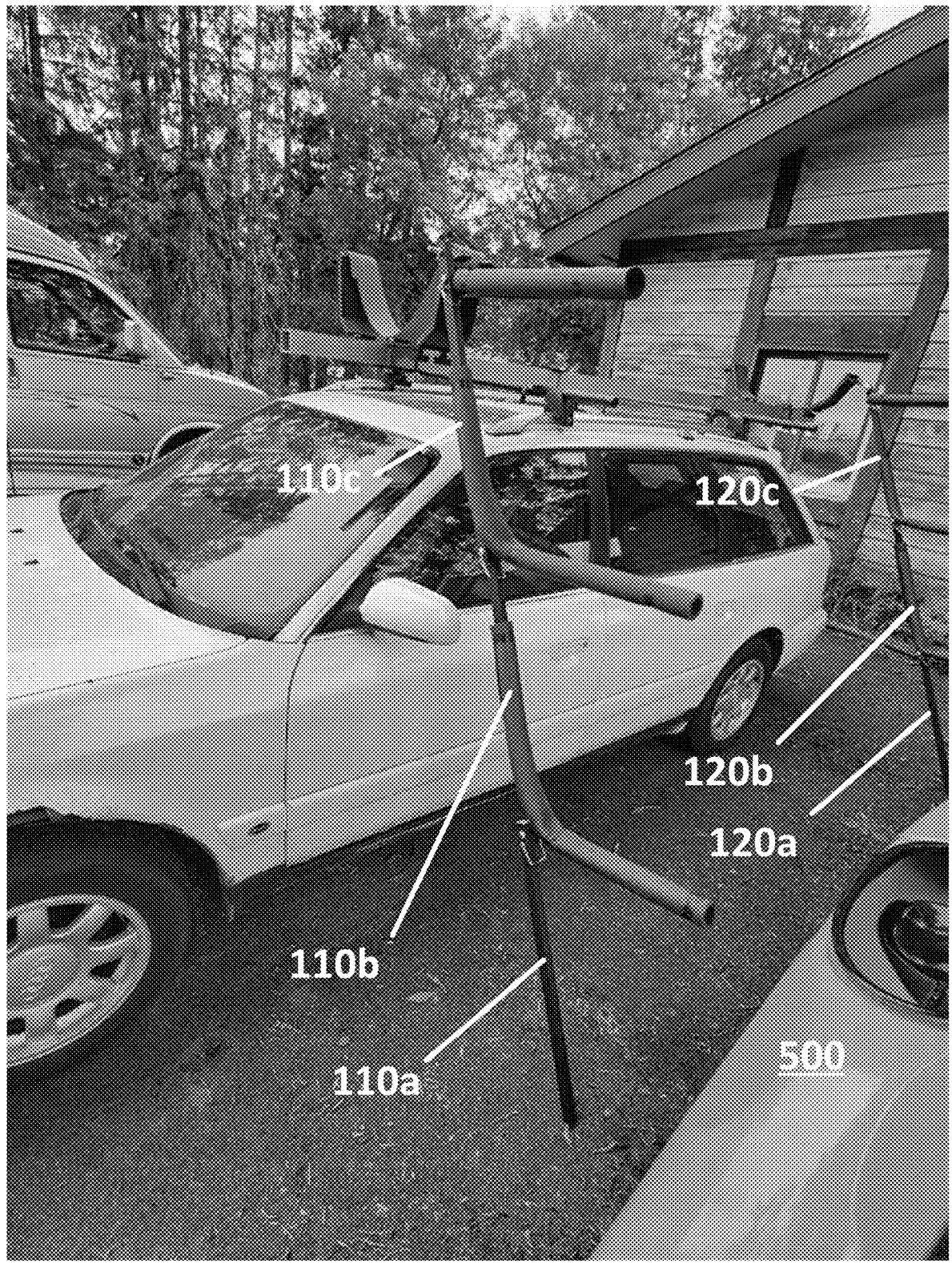
FIG. 12 is a front, driver side perspective view of a vehicle bearing the system of FIG. 1.
Figure 13:
FIG. 13 is a perspective view of a portion of the system of FIG. 1 coupled to a rear portion of a vehicle.
Figure 14:
Figure 15:
Figure 16:
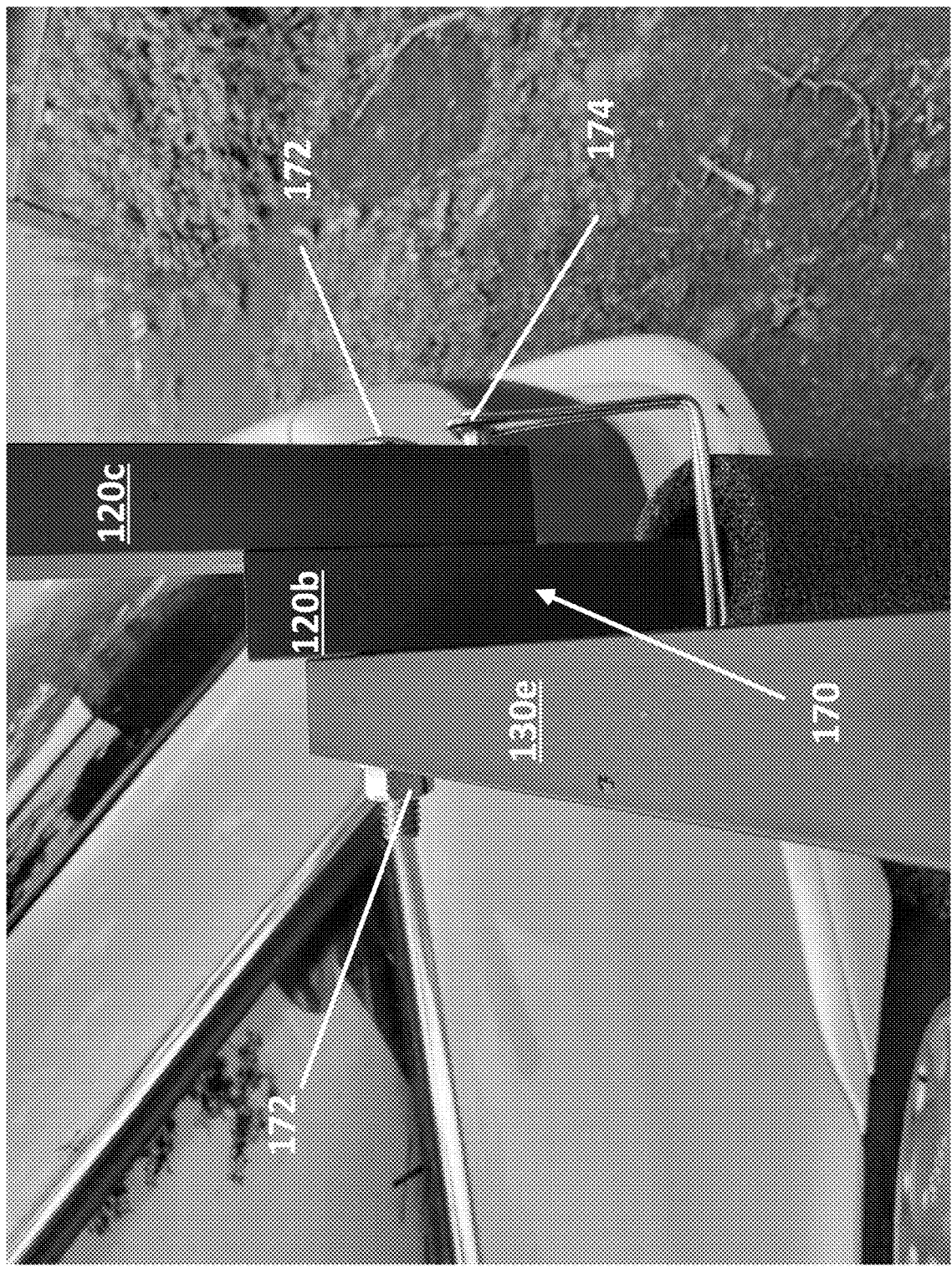
Figure 17:
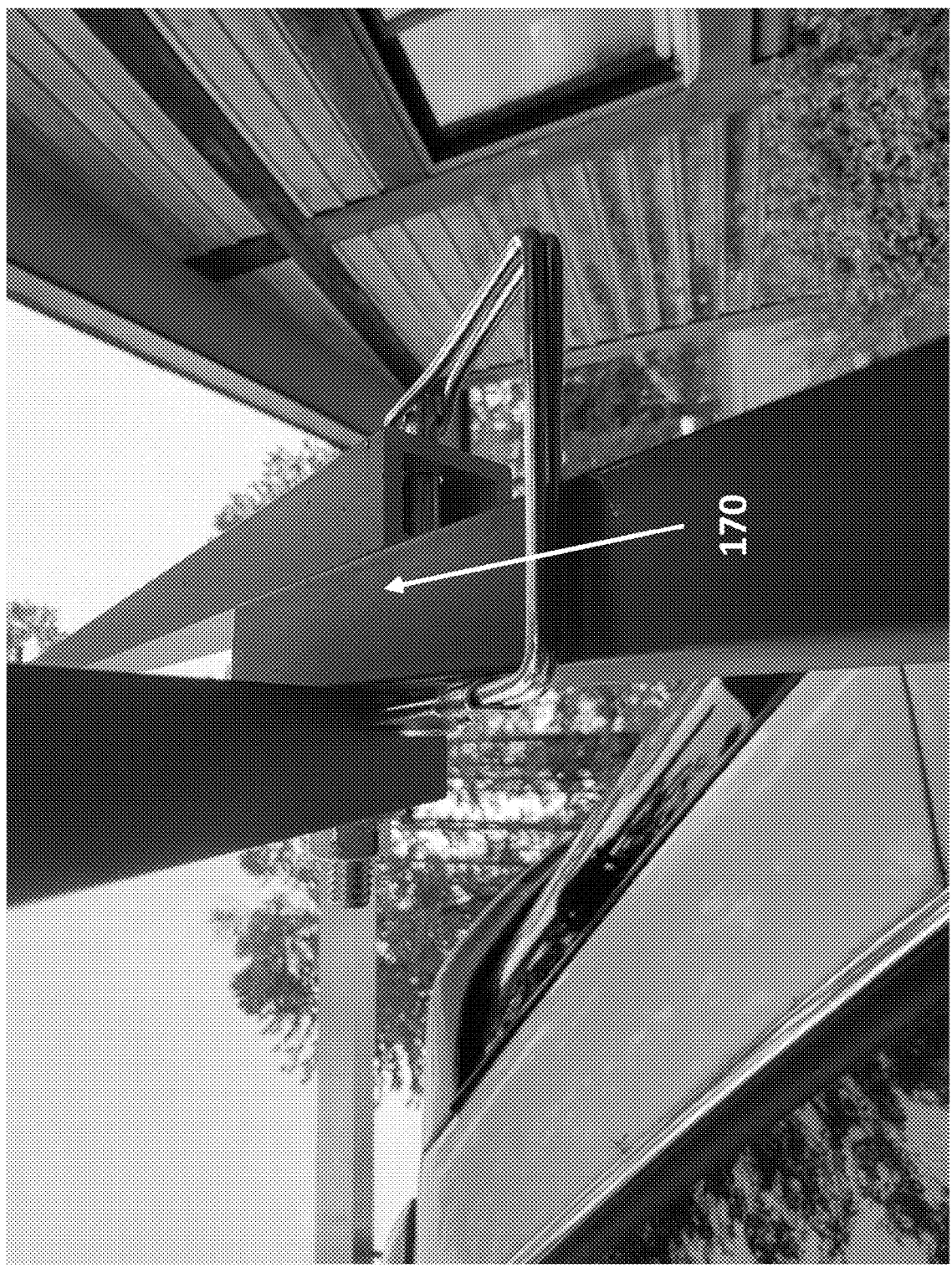

In some implementations, each support 110, 120 and protrusions 130 can be assembled from a plurality of shorter components, or subcomponents. For example, the shorter components can be coupled to each other by way of at least one fastener. If desired, the shorter components can be nested within each other and extend with respect to each other in a telescoping manner. In some implementations, the shorter components are hingedly coupled to each other. With reference to the figures, and particularly FIG. 2, it can be observed that each of the supports 110, 120 is formed from three main body sections along its length that are connected at two pivoting joint or couplings 170 through which a bolt passes. The bolt or other axle, pin or fastener passes through two adjacent lengthwise components, and then the protrusion 130, such that the bolt or pin passes through all three components. Close up figures of the joints 170 and their structure can be see in FIGS. 9-11, and 14-17. Support 110 is composed, from bottom to top, of lengthwise sections 110a, 110b, 110c, whereas support 120 is composed, from bottom to top, of lengthwise sections 120a, 120b, 120c (FIG. 12). As can be seen, with reference to FIG. 16, the lower end of upper portion 120c of support 120 is laterally arranged to the right with the upper end of section 120b, and protrusion 130e is arranged to the left of 120b. A bolt 172 passes through all three components, forming a point of rotation, such that the components mutually operate as hinge sections. A removable pin 174 also passes through components 120b, 120c through aligned drilled holes to hold components 120b, 120c stationary, and preventing pivoting. The pin 174 extends outwardly from components 120b underneath component 130e, providing a resting place for component 130e, preventing it from pivoting downwards (FIG. 17). Component 120a, on the other hand, will also be laterally offset with respect to component 120b, and may align for example, with component 120c longitudinally, or be located to the "left" of component 120b as viewed in FIG. 16.

Figure 20:
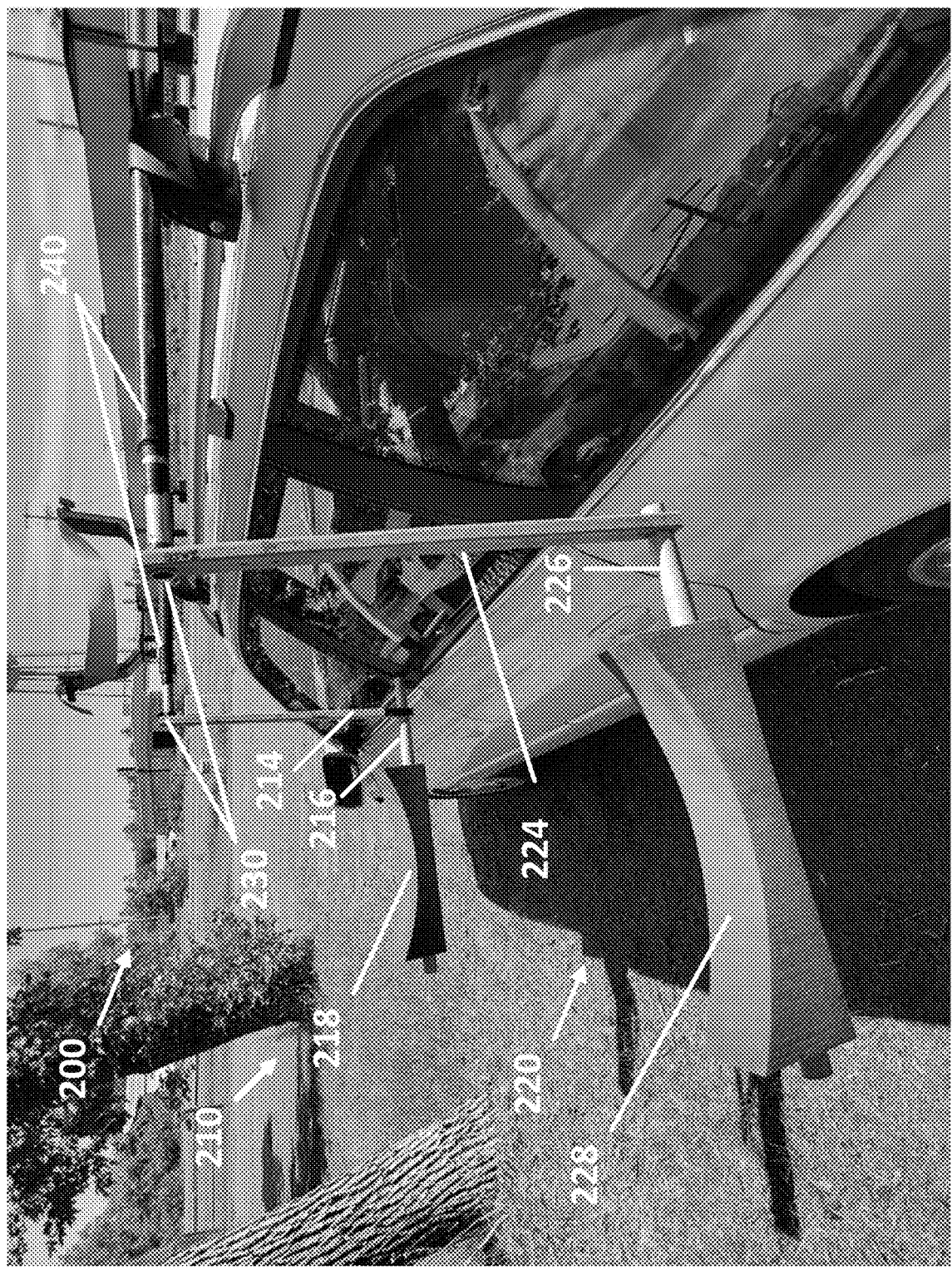
FIGS. 20-22 illustrate various a perspective views of a vehicle bearing a second system and related method for loading an elongate object on top of a vehicle in accordance with aspects of the present disclosure.
Figure 21:
Figure 22:
Figure 23:
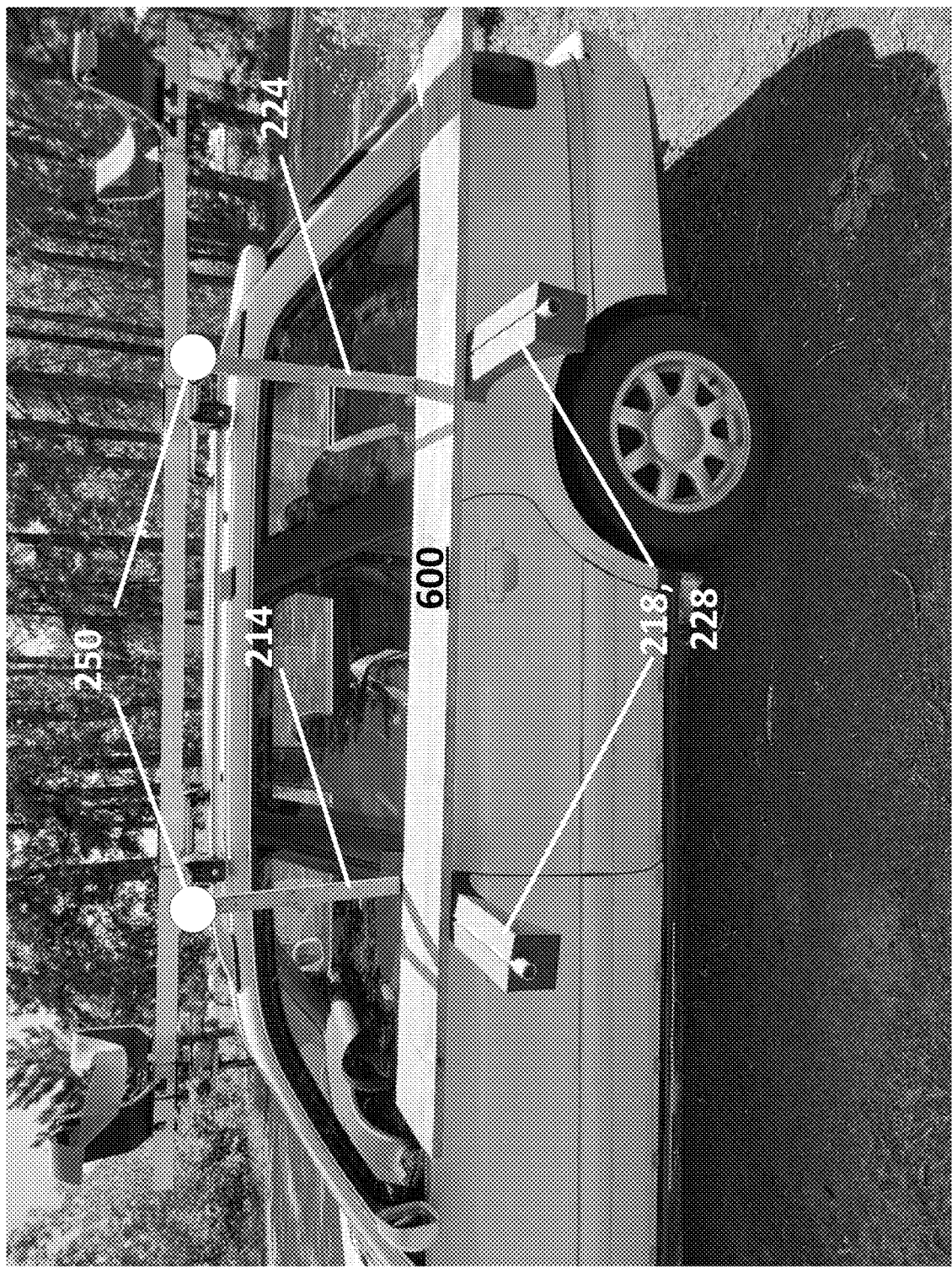
FIG. 23 illustrates the system of FIG. 20 with the cradles of the system inverted to hold a flat board or work surface in accordance with the present disclosure, and illustrating examples of locations for ratchets or coil springs to facilitate lifting of a load upwardly.
Figure 24:
FIG. 24 illustrates a partial articulation of the rearward arm of the system of FIG. 20.

With reference to FIGS. 20-24, the disclosure provides further methods of and devices for loading an elongate object on top of a vehicle in the form of system 200. This can include a first movable cradle 210 coupled to a vehicle, and a second movable cradle 220 coupled to a vehicle. Each of the first cradle 210 and the second cradle 220 can be positioned in a first position alongside the vehicle, such as a lower position as illustrated in FIGS. 20-22. An elongate object (e.g., 600) can be placed onto the first cradle 210 on the second cradle 220 FIG. 23). The method then includes raising the first movable cradle to a second position higher than the first position, and then raising the second movable cradle to a second position higher than the first position after raising the first movable cradle to the second position. If desired, the cradles of any implementation herein can be reversible, rotatable or exchangeable to provide a flat surface, a concave surface or a convex surface. FIG. 24 illustrates an example of cradle 220 articulating about pivot 230. As illustrated in FIG. 20, in some implementations, the system can be cantilevered from the roof of a vehicle by providing cantilevered extensions 240 that can couple, for example, to a roof rack. These extensions or support 240 can terminate in a pivotal connection that couples to a swing arm (214, 224) which in turn couple to respective horizontal supports (216, 226) that in turn support pads 218, 228.

In some implementations, the first movable cradle and the second movable cradle can be automatically held in place in the second position by a pawl, ratchet, or detent, represented schematically by reference number 250 in FIG. 23. If desired, the first cradle and second cradle are moved from the first position to the second position by rotating each of them about an independent axis attached to a swing arm 214, 224. As can be seen, the pads 218, 228 can be provided with a first concave side to hold a rounded object, and a second flattened side to receive a flat object 600, such as a plank or other object. As can be appreciated, multiple planks or a wider plank can be provided over pads 218, 228 to provide a work surface, and it will be appreciated that this can be provided on either side of the vehicle. This can be of particular use in outdoor activities, such as camping at a website.

Figure 25:
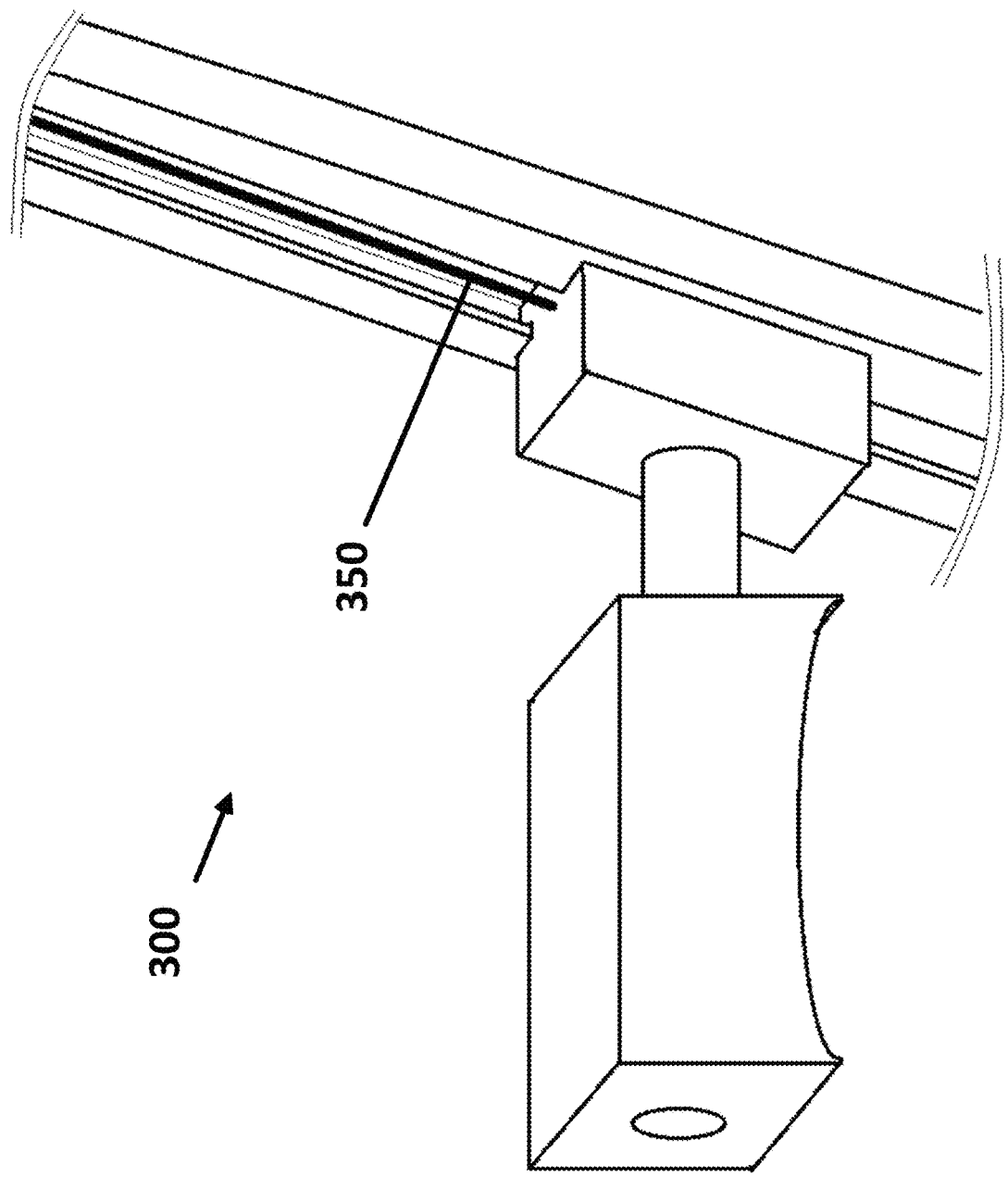
FIG. 25 is a view of a third embodiment of a system and related method for loading an elongate object on top of a vehicle in accordance with aspects of the present disclosure.
Figure 26:
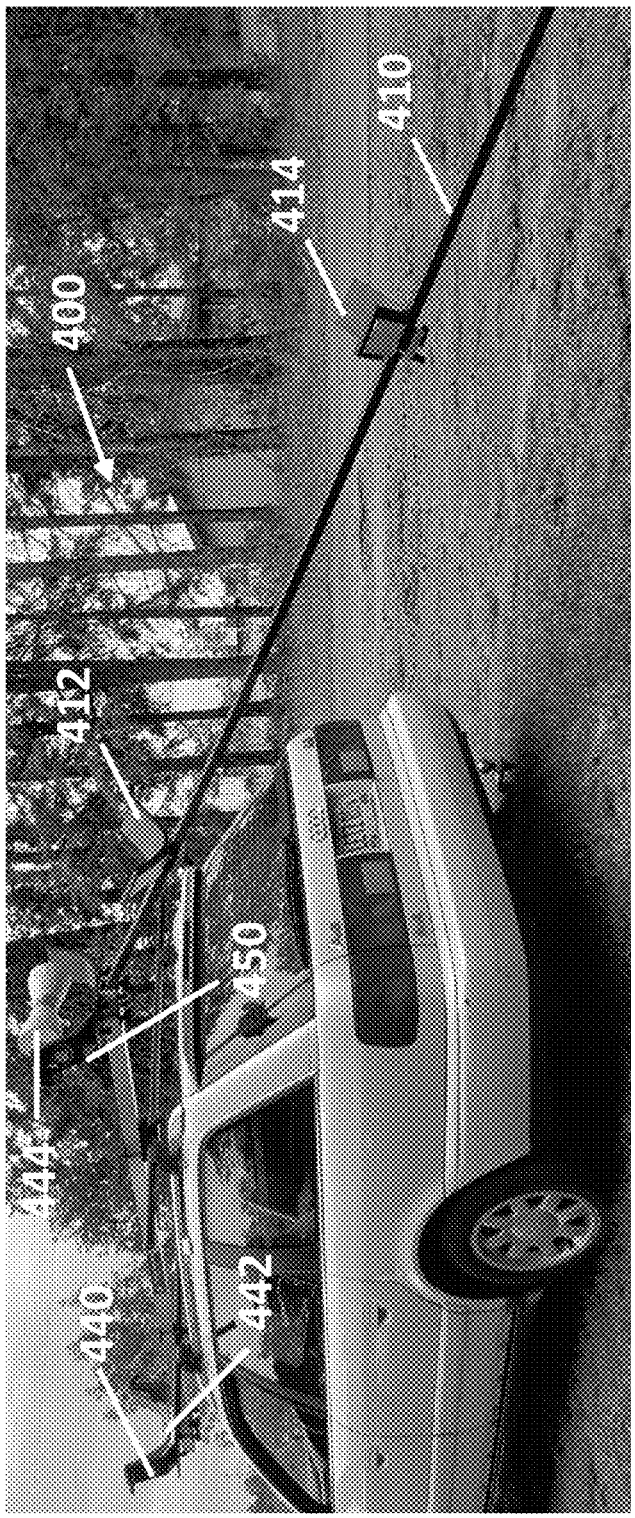

With reference to FIG. 25, in embodiments 300, a support can be provided having a that is moved upwardly from a first position to a second position by sliding them along a vertical direction in a track.

In some implementations, the first movable cradle and the second movable cradle can be biased from the first position toward the second position by a lift assist device 350 selected from the group consisting of a spring, an elastic band and a strut. The lift assist device can be linear, such as a shock cord or tension spring or strut for embodiment 300, or may be a rotationally loaded coil spring for embodiment 200 that is wound around the pivot points, or centers of rotation 230, and urges against swing arms 214, 224. If desired, in use, it is possible to apply an external force to the first movable cradle or second movable cradle to move the first movable cradle or second movable cradle toward the first position to energize the lift assist device. Or, if a lift assist is not provided, in use, embodiments 200, 300 can be operated by lifting a first end of the elongate device, and then cinching up the cradle (e.g., 210, 220 or the cradle of 300), and then letting the object rest on the cradle at the new height of the cradle. This process can be repeated until the object has reached the desired height, and can be laterally transferred over to the roof of the vehicle.

FIGS. 26-29 present aspects of further systems and methods for loading an elongate object on top of a vehicle. As depicted, the system can be used to load a vehicle from the rear of the vehicle, but can also be used to load from the front, or side, if so configured.

Figure 28:
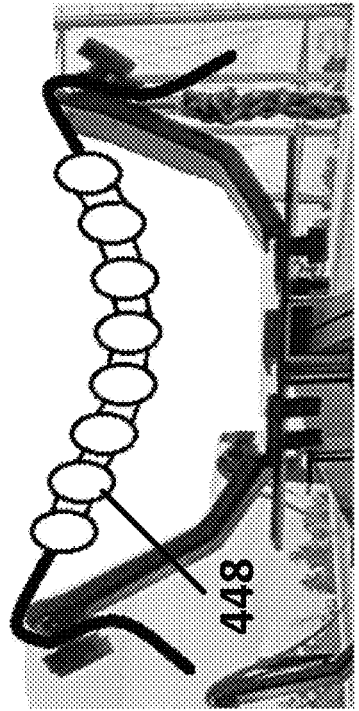
Figure 27:
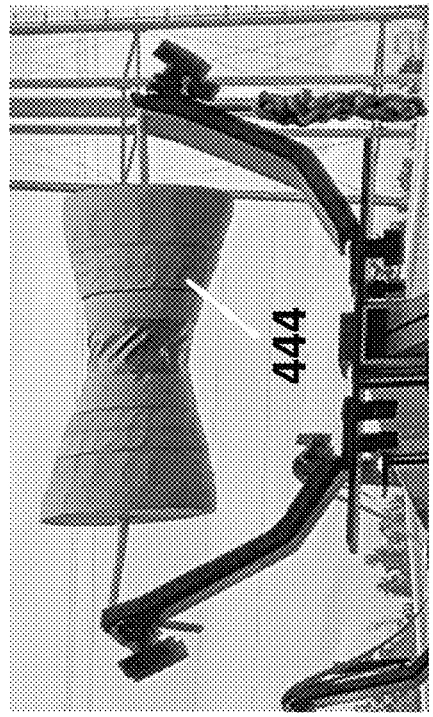

A bracket system is coupled to the roof rack including a front cradle 440 and a rear cradle 450 that are mounted to an elongate rail that is oriented along the direction of the vehicle. A front end of a second rail 410 is pivotally (or otherwise) coupled to the back end of the rail to which the cradles are fastened. A second, free end of rail 410 can contact the ground, or be held in place by a stand or ground bracket 416 which may be of a fixed height, or an adjustable height. Rail 410 includes two cradles, 412 and 414, for supporting an elongate object during loading. In practice, the elongate object, such as a watercraft or roll of carpeting, for example, can be inserted into the cradles and pushed up on top of the vehicle into cradles 440, 450. This can be accomplished by laying the elongate object on the ground alongside rail 410. The front end of the object can then be lifted and rested in cradle 412, while leaving the back end of the elongate object resting on the ground. The rear end of the object can then be lifted off the ground and rested into cradle 414. Next, the elongate object can be advanced by pushing it toward the front of the vehicle by sliding it over cradle 412, and into cradle 450. As shown, cradle 450 can be provided with one or more rollers 444 that span the width of the cradle 450 to act as a wheel that the elongate object can be rolled over toward the front cradle 440 and rested in a strap or sling 442 in the front cradle. The roller 444 can be provided with a non-uniform cross section along its length that is smaller in its midsection to define a groove. Alternatively, as depicted in FIG. 28, a cord or sling 448 may be provided including a plurality of smaller rollers that are ball or wheel shaped that can conform to the shape of the elongate object as it is rolled over the cradle 450. Or, roller 444 can have a solid axle and include a plurality of spaced apart rollers along its length of the same or different diameters, as desired. After loading is complete, the bar 410 can be broken down into smaller sections and disassembled and reattached later, as desired. Alternatively, bar 410 can be of a sufficiently small dimension to be slid inside of the elongate rail to which the cradles 440, 450 are attached. Cradles 412, 414 can be removable attached to rail 410.

FIGS. 30-51 illustrate a further implementation of a system in accordance with the present disclosure, or aspects thereof.

For purposes of illustration only, FIGS. 30-51 illustrate a further implementation of a boat loading system 600 in accordance with the present disclosure.

Figure 30:
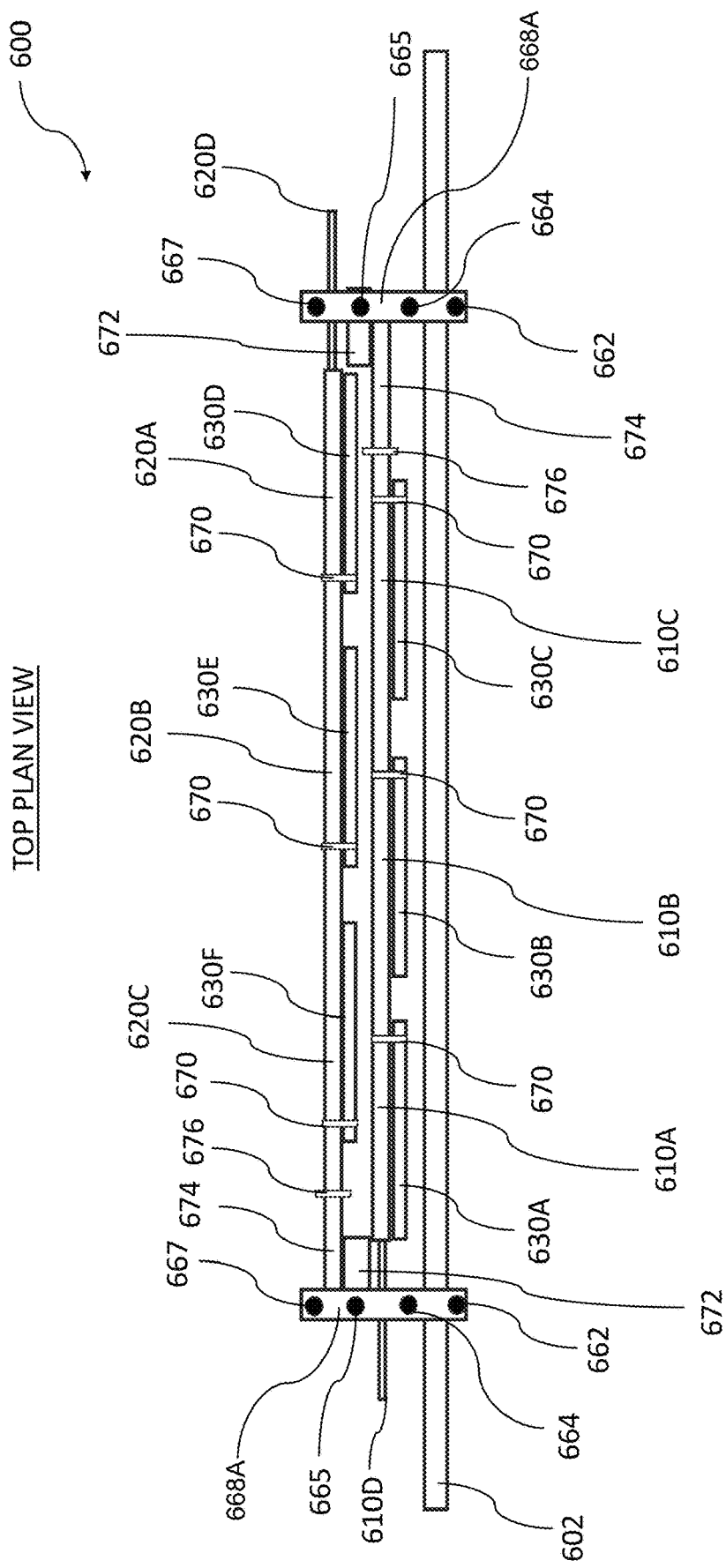

FIG. 30 is a top plan schematic view of the system 600 as viewed when the system 600 is in an optional collapsed state when mounted to a roof of a vehicle. FIGS. 31-34 are illustrations of the system 600 in a deployed format in order to load a watercraft or other elongate object onto the roof of a vehicle.

Figure 38:
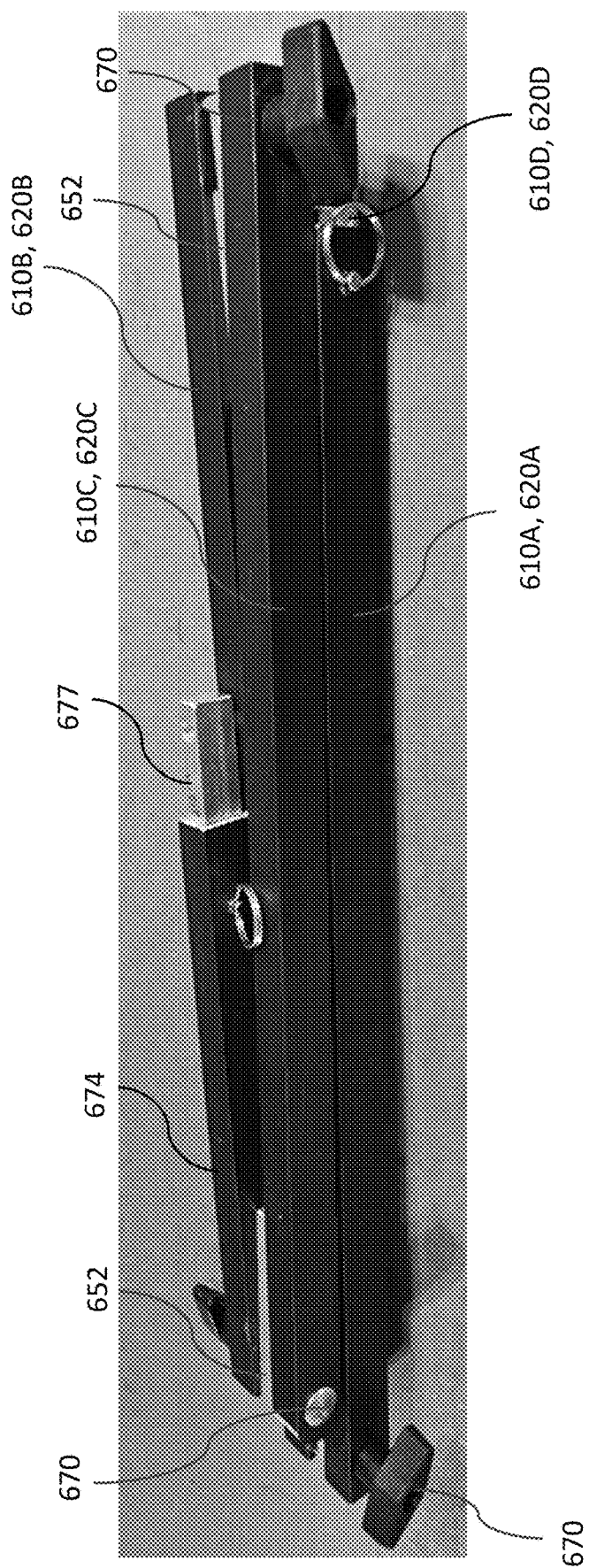

FIGS. 30-34 illustrate a first support 610 disposed closer to a front of a vehicle and a second support 620 disposed closer to a rear of the vehicle. Support 610, as illustrated, can be formed from three discrete sections 610A, 610B and 610C, and support 620, as illustrated, can be formed from three discrete sections 620A, 620B and 620C. When provided in this form, the segments of the support along with support stubs 652, 654, described below, can be folded into a compact form about hinge points 670 as depicted in FIG. 38. Alternatively, the supports 610, 620 can be maintained in a straight configuration, and folded onto the top of the vehicle, described in further detail below. Supports 610, 620 can similarly be provided in a non-folding format in a single piece, or two or more pieces that can be stacked together axially wherein a reduced width end of a first support portion can be received within a channel of an adjacent support portion.

Figure 32:
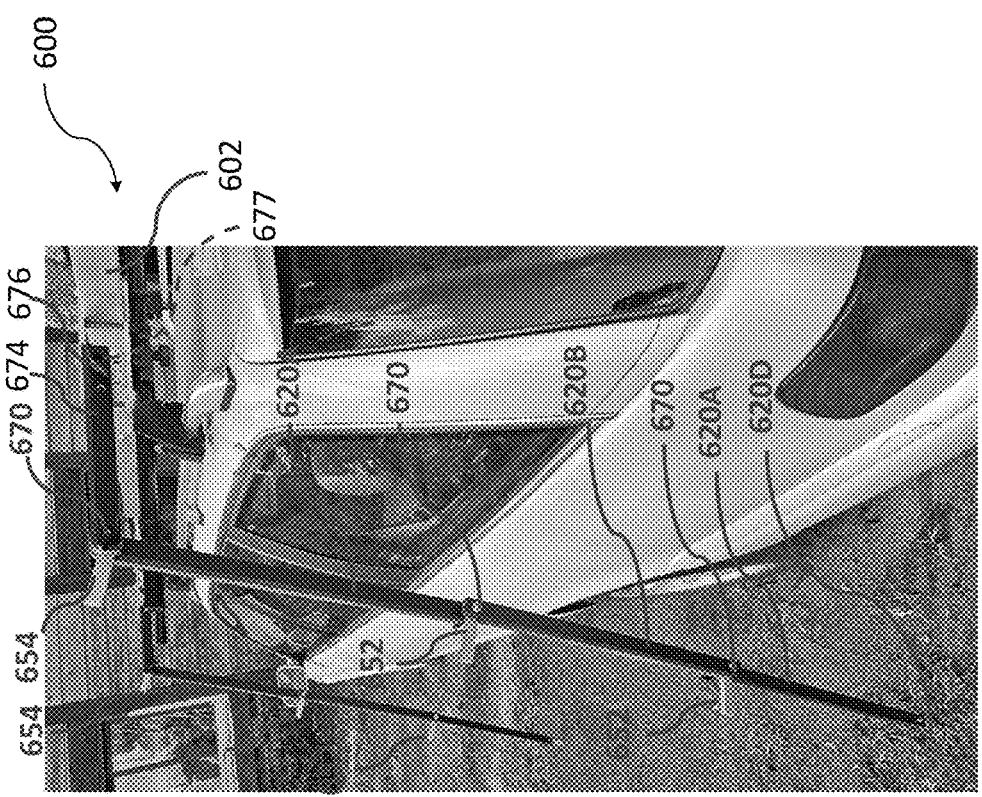
Figure 31:
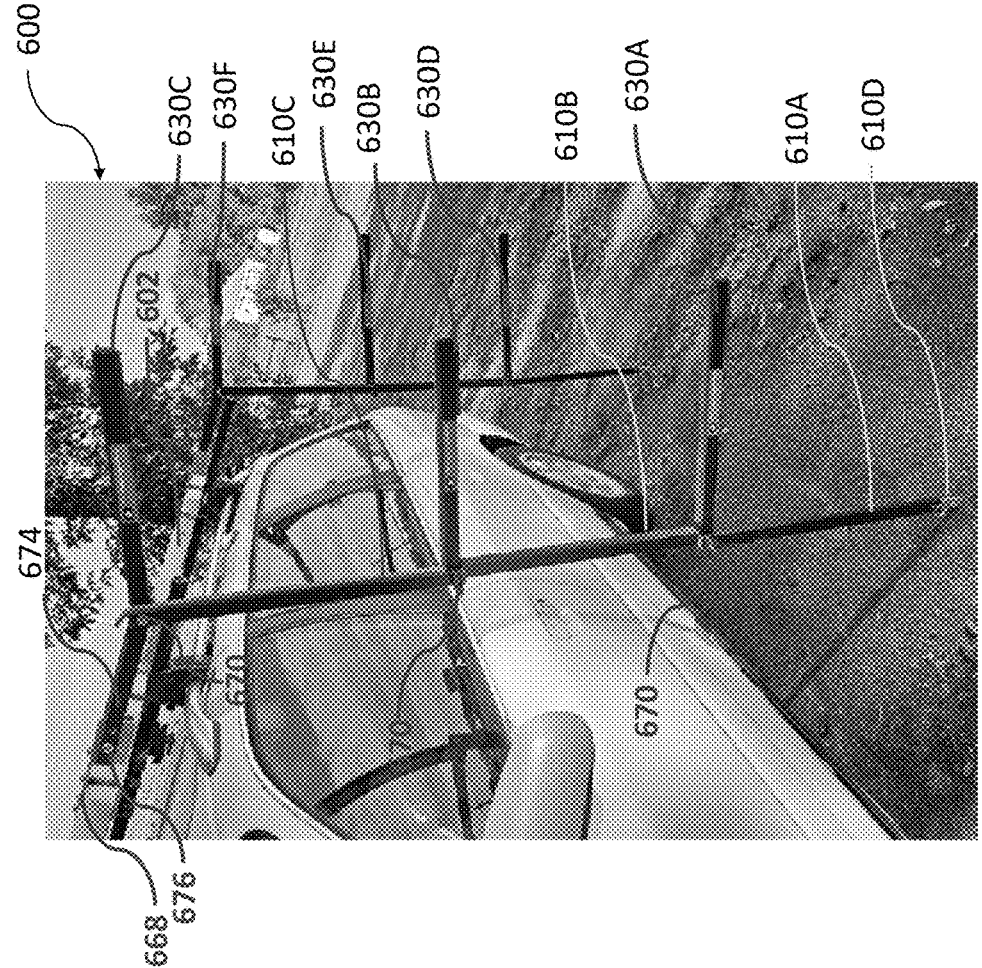
Figure 34:
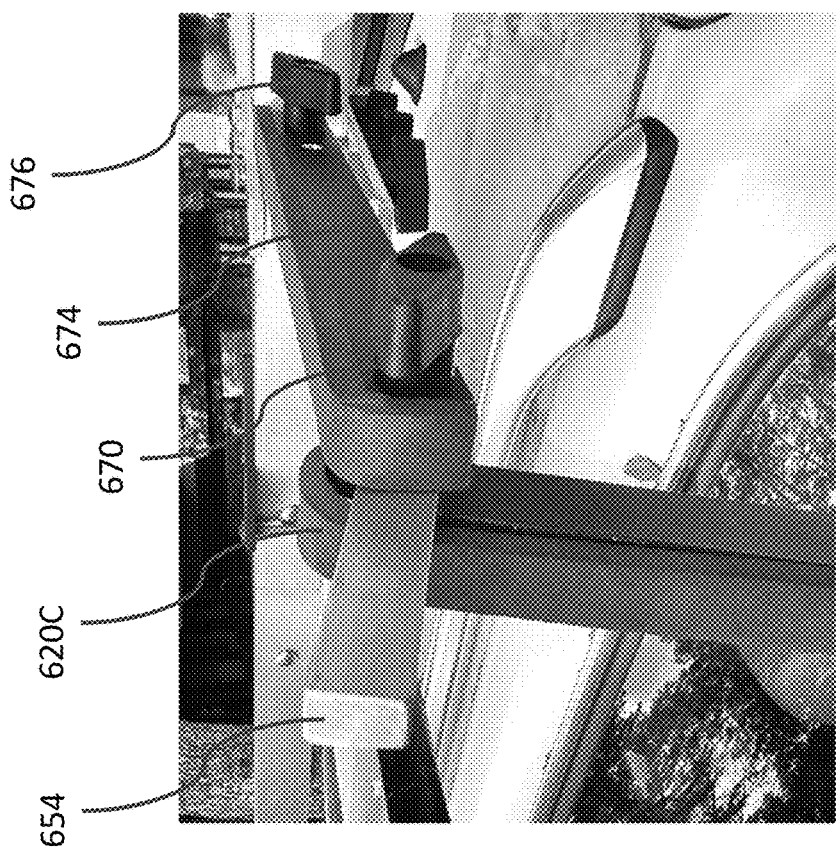
Figure 33:
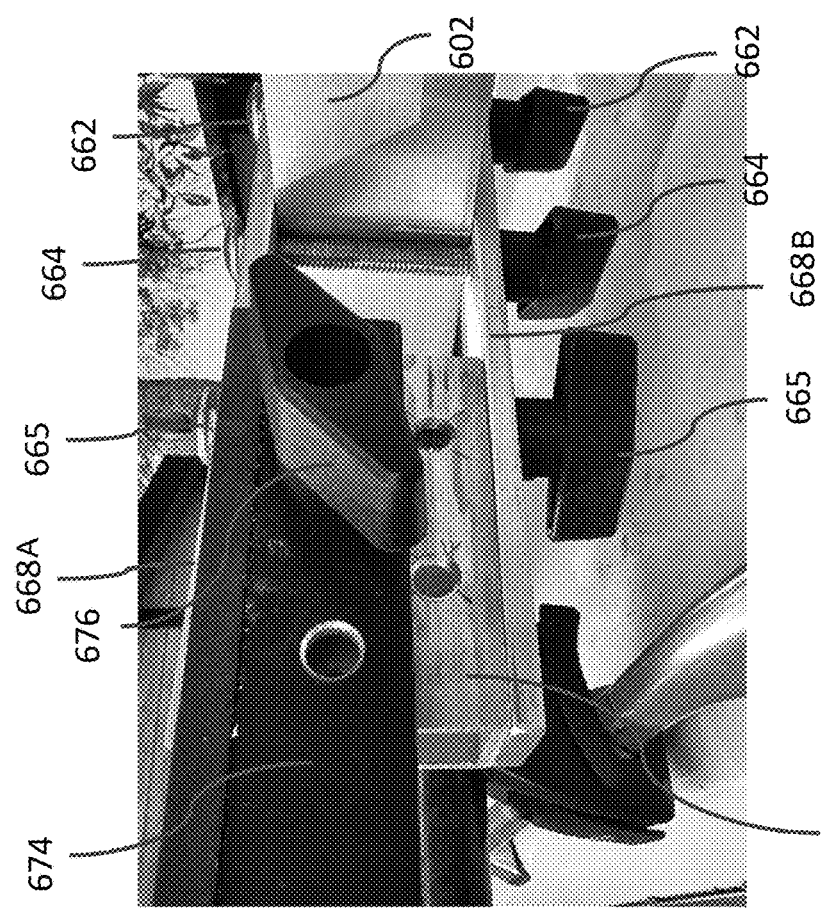
Figure 36:
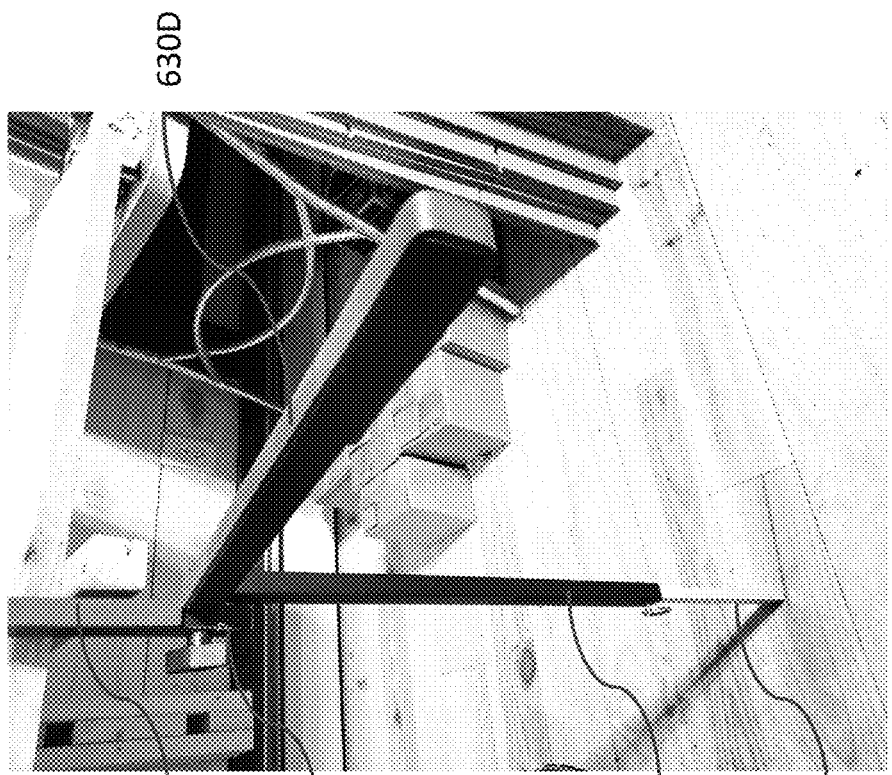
Figure 35:
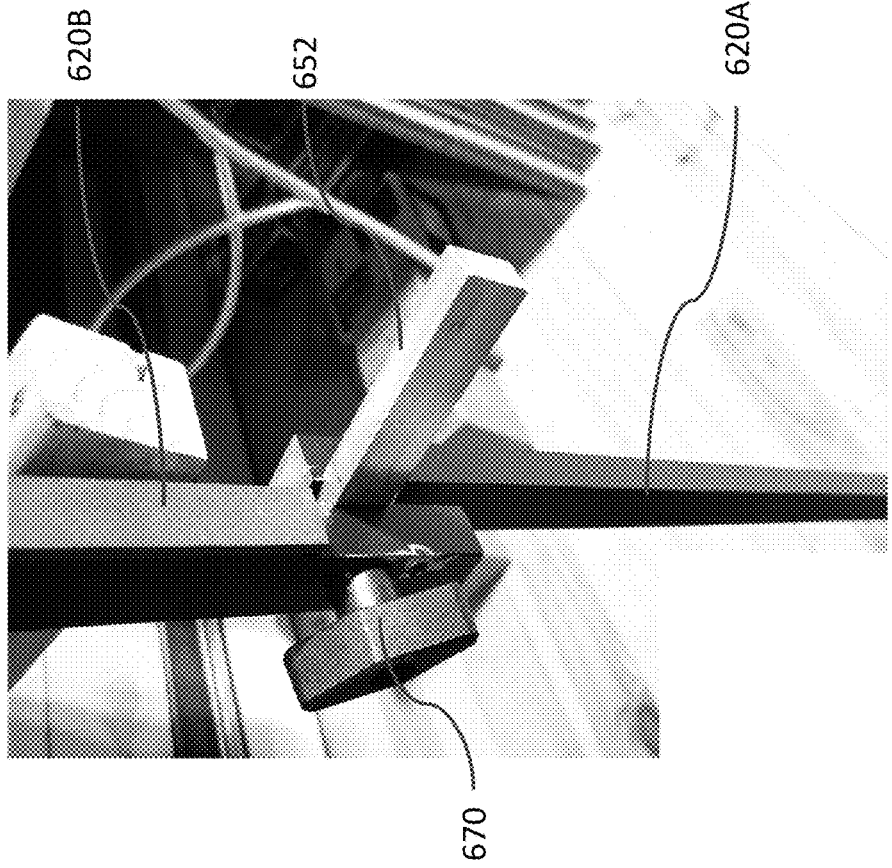
Figure 37:
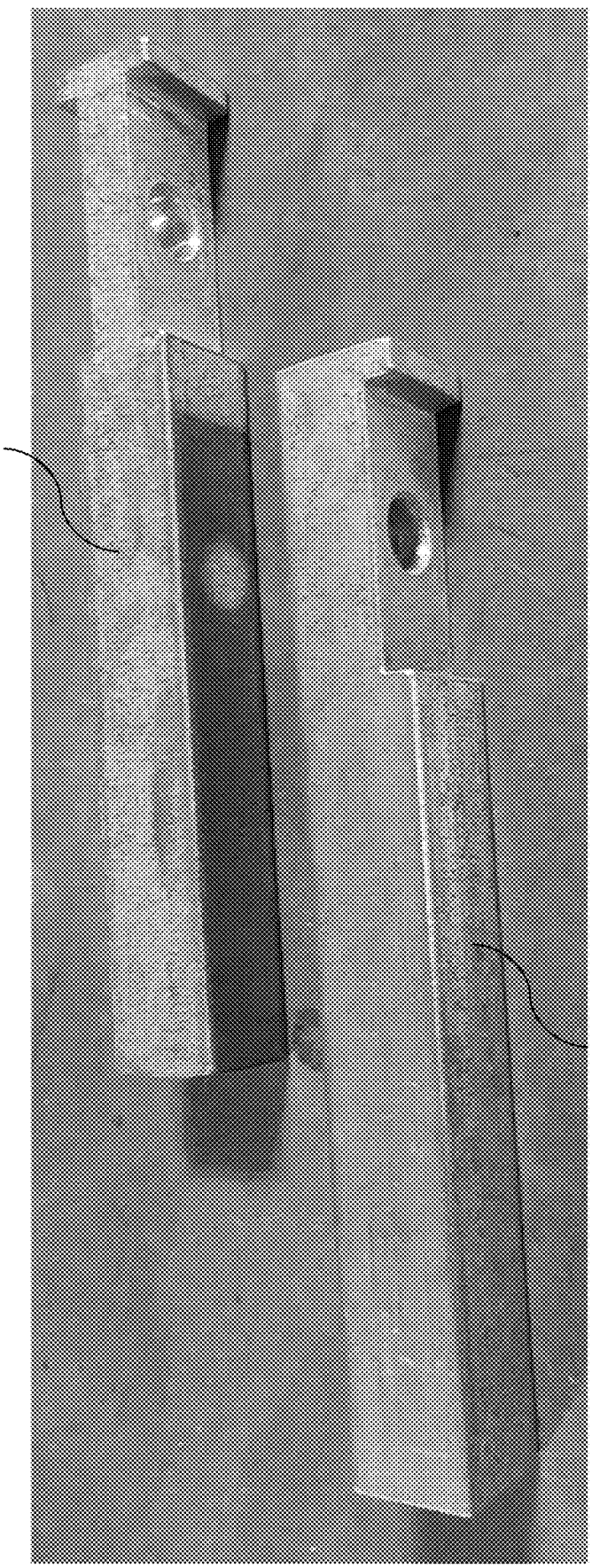

A plurality of supports 630A-630D can be coupled to the supports 610, 620 in a manner similar to the first implementation described above in FIG. 1. In system 600, to maintain orientation of the supports 630A-630D at a desired angle with respect to supports, support stubs 652, 654 can be used. Support stub 652 defines a transverse channel on each side thereof to slidably receive an orthogonally oriented support member (e.g., 620A, 620B in FIGS. 35-36) therein on either side. The channel prevents the stub from rotating with respect to the adjacent supports (e.g., 620A, 620B) to maintain an elongate body of stub 652 in an orthogonal orientation with respect thereto. Alternatively, the channel can be oriented at a different angle within stub 652 to maintain a desired angular relationship between the stub 652 and the adjacent supports (e.g., 620A, 620B). A fastener 670 that also functions as a hinge point or pivot can clamp components 620A, 652, 620B together, wherein a bolt is received through one side of the support 620A with a square hole to prevent rotation of the bolt that is received by a threaded handle on the opposing side. Each joint of system 600 can provide a similar assembly at the first and second rotatable joints on each of support 610 and 620. A single channel stub 652 can be used at the upper joint where the upper support 610C, 620C joins lateral support 674, wherein the channel of stub 654 is oriented toward the upper support 610C, 620C and the opposing smooth side of the stub 654 can be oriented toward the lateral support 674, and further wherein the components are clamped together to maintain an orthogonal relationship between stub 654 and support segments 610C, 620C. This further permits the supports 610, 620 to be lifted off the ground and rotated about the pivot joining stub 654 to support 674 and support segments 610C, 620C. Once held level with respect to support 674 and upper and lower plates 668A, 668B, respectively, and block 672, the supports 610, 620 to be rotated about an axis defined by a bolt 665 that passes through plates 668A, 668B and pillow block 672. Each support 610, 620 can be lifted and rotated inward at a level above the roof of the vehicle and collapsed as illustrated in the top plan schematic view of FIG. 30. FIG. 30 is a simplified view showing the supports 630 in place and pivotally connected to each support 610, 620. In the illustrated embodiment of FIG. 30, the supports 610, 620 are straight, and can be formed from telescoping sections, or axially interfitting sections. But, the specific version of the supports 610, 620 illustrated in FIGS. 31-34 can also be folded up and accommodated in this manner. Supports 630 can be left in place attached to the supports 610, 620, or can be removed, and stubs 652/654 can remain in place, if desired. Typically, stub 652 will be used in an implementation where adjacent pivoting segments are used for supports. Stub 654 can be used when the supports are either a single piece, or axially stacked, or telescoping segments. Once folded inwardly above the vehicle, the leg extensions 610D, 620D can be extended between the upper and lower plates 668A, 668B, and an outer bolt 667 can be inserted to hold the leg extension 620D in place, whereas leg extension 610D can be routed in the space between bolts 664 and 665. An elastic member (not shown) such as an elastic cord can be wrapped around the assembly as depicted in FIG. 30 to prevent undesired vibration. When the system 600 is deployed as illustrated in FIGS. 31-34, the bolt 667 can be inserted to stabilize the system 600. As further depicted in the figures, each support 610, 620 can be coupled at an upper end to a lateral support 674 that is in turn coupled to a respective pillow block 672. Particularly, an internal support 677 (FIG. 38) within the tubular member 674 can be bolted in place with the tubular member to the pillow block 672. Pillow block 672 is coupled via a pivoting connection to upper and lower plates 668A, 668B by bolt 665. Upper and lower plates 668A, 668B in turn are clamped about elongate rail 602 by bolts 662 and 664 which are located on either side of elongate rail 602. Supports 630 can be slid over stubs 652, 654 when the system is deployed as depicted in FIGS. 31-32 as well as FIGS. 35-36.

As further depicted in the figures, each support 610, 620 can be coupled at an upper end to a lateral support 674 that is in turn coupled to a respective pillow block 672. Particularly, an internal support 677 (FIG. 38) within the tubular member 674 can be bolted in place with the tubular member to the pillow block 672. Pillow block 672 is coupled via a pivoting connection to upper and lower plates 668 by bolt 665. Upper and lower plates 668 in turn are clamped about elongate rail 602 by bolts 662 and 664 which are located on either side of elongate rail 602. Supports 630 can be slid over stubs 652, 654 when the system is deployed as depicted in FIGS. 31-32 as well as FIGS. 35-36.

Figure 50:
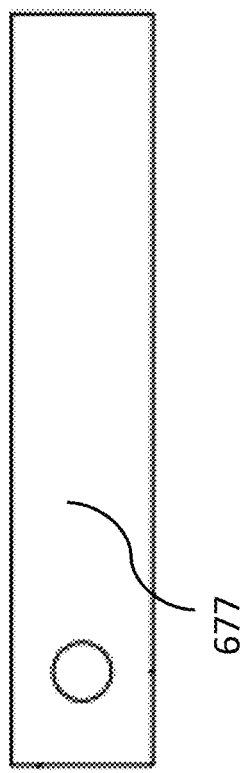
Figure 51:
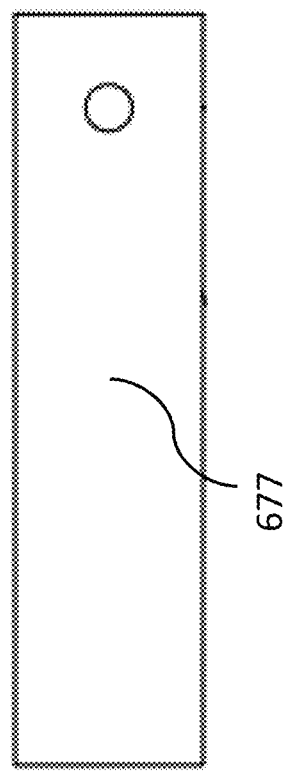

FIG. 39 illustrates the bottom leg 610A, 620A of the system, which defines a hole through an upper end for bolt/pivot 670 and a lower hole to accept a pin to hold leg extension 610D, 620D in place. FIGS. 40 and 41 illustrate the center leg portion 610B, 620B which defines square holes in an outer side thereof to receive a square shank of a carriage bolt to prevent rotation when an opposing threaded handle on the other end of the carriage bolt is tightened to facilitate hand operation without tools. FIGS. 42 and 43 illustrate opposing sides of upper portions 610C, 620C which similarly define square holes in an outer side thereof to receive a square shank of a carriage bolt. The leg extension 610D, 620D is illustrated in FIG. 44, which looks the same on each lateral side, and lateral support or mounting arm 674 is illustrated in FIG. 45. FIGS. 46-47 present a face view and a side view of stub 652, and FIGS. 48-49 present a face view and a side view of stub 654. FIG. 50 presents a top view of the mounting bracket 677, whereas FIG. 51 presents a side view of the mounting bracket 677.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A method of loading an elongate object on top of a vehicle, comprising:
   providing a plurality of elongate supports, each said support including a plurality of generally parallel protrusions that extend outwardly from each respective elongate support;
   coupling a first of the plurality of elongate supports to a vehicle with its respective plurality of generally parallel protrusions extending outwardly with respect to the vehicle;
   coupling a second of the plurality of elongate supports to a vehicle with its respective plurality of generally parallel protrusions extending outwardly with respect to the vehicle, wherein the first and second elongate supports are separated from one another along the length of the vehicle by a first distance;

providing an elongate object that is longer than the first distance alongside the vehicle;

lifting a first end of the elongate object and placing it on a lower protrusion extending outwardly from the first of the plurality of elongate supports, after which the elongate object rests on the lower protrusion of the first of the plurality of elongate supports;

lifting a second end of the elongate object and placing it on a lower protrusion extending outwardly from the second of the plurality of elongate supports, after which the elongate object rests on the lower protrusion of the second of the plurality of elongate supports and on the lower protrusion of the first of the plurality of elongate supports;

lifting the first end of the elongate object and placing it on an upper protrusion extending outwardly from the first of the plurality of elongate supports, after which the elongate object rests on the upper protrusion of the first of the plurality of elongate supports and the lower protrusion of the second of the plurality of elongate supports;

lifting the second end of the elongate object and placing it on an upper protrusion extending outwardly from the second of the plurality of elongate supports, after which the elongate object rests on the upper protrusion of the second of the plurality of elongate supports and on the upper protrusion of the first of the plurality of elongate supports;

lifting the first end of the elongate object into a first cradle on top of the vehicle;

lifting the second end of the elongate object into a second cradle on top of the vehicle;

collapsing the generally parallel protrusions coupled to each elongate support by rotating each said generally parallel protrusion about a respective pivot point to cause each said generally parallel protrusion to be parallel with each respective elongate support;

lifting a lower end of each said elongate support until each said elongate support is in a horizontal elevated position; and rotating each said elongate support about a vertically-oriented axis to fold each said elongate support inwardly on top of the vehicle.

2. The method of Claim 1, further comprising securing the elongate object to the first cradle and the second cradle.

3. The method of claim 1, wherein at least one of the plurality of elongate supports is coupled proximate an first end of the elongate support to the vehicle, and further wherein a second end of the elongate support is positioned to rest on the ground.

4. The method of claim 3, further comprising coupling at least one of the plurality of the elongate supports to the vehicle at a second location to help stabilize said elongate support.

5. The method of claim 1, wherein each elongate support and each protrusion is padded to prevent damage to the elongate object.

6. The method of claim 1, further comprising assembling at least one of the plurality of elongate supports from a plurality of shorter components.

7. The method of claim 6, wherein the shorter components are coupled to each other by way of at least one fastener.

8. The method of claim 6, wherein the shorter components are nested within each other and extend with respect to each other in a telescoping manner.

9. The method of claim 6, wherein the shorter components are hingedly coupled to each other.

10. The method of claim 1, wherein the elongate object is rested against a main portion of each elongate support when it is placed on at least one of the protrusions.

11. A method of loading an elongate object on top of a vehicle, comprising:
coupling a first movable cradle to a vehicle;
coupling a second movable cradle to a vehicle;
positioning each of the first cradle and the second cradle in a first respective position alongside the vehicle;
placing an elongate object onto the first cradle and onto the second cradle;
raising the first movable cradle to a second respective position higher than the first respective position of the first movable cradle;
raising the second movable cradle to a second respective position higher than the first position of the second movable cradle after raising the first movable cradle to the second position of the first movable cradle;
wherein the first movable cradle and the second movable cradle are each moved from their first respective position toward their second respective position at least in part by rotating each of the first movable cradle and the second movable cradle about an independent axis attached to a swing arm.

12. The method of claim 11, further comprising lifting the first end of the elongate object into a first cradle on top of the vehicle.

13. The method of claim 12, further comprising lifting the second end of the elongate object into a second cradle on top of the vehicle.

14. The method of claim 13, further comprising securing the elongate object to the first cradle and the second cradle.

15. The method of claim 11, wherein each of the first movable cradle and the second movable cradle is are automatically held in place in their second position by a pawl, ratchet, or detent.

16. The method of claim 11, further comprising applying an external force to the first movable cradle or second movable cradle to move the first movable cradle or second movable cradle toward their first respective position.

* * * * *